(12) United States Patent
Inui

(10) Patent No.: US 7,984,464 B2
(45) Date of Patent: Jul. 19, 2011

(54) DIGITAL BROADCAST RECEIVING APPARATUS

(75) Inventor: Yasuhiro Inui, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1243 days.

(21) Appl. No.: 11/643,617

(22) Filed: Dec. 22, 2006

(65) Prior Publication Data

US 2007/0165855 A1 Jul. 19, 2007

(30) Foreign Application Priority Data

Dec. 28, 2005 (JP) ................................. 2005-378323

(51) Int. Cl.
*H04N 7/10* (2006.01)
*H04N 7/167* (2011.01)
(52) U.S. Cl. ............... 725/31; 725/25; 725/27; 380/210
(58) Field of Classification Search ........................ None
See application file for complete search history.

(56) References Cited

U.S. PATENT DOCUMENTS

| 6,067,440 | A * | 5/2000 | Diefes ............................. 725/27 |
| 6,650,754 | B2 * | 11/2003 | Akiyama et al. .............. 380/278 |
| 6,738,905 | B1 * | 5/2004 | Kravitz et al. ................. 713/194 |
| 6,742,182 | B1 * | 5/2004 | Perlman .......................... 725/25 |
| 2003/0026424 | A1 * | 2/2003 | McGarrahan et al. ........ 380/255 |
| 2008/0298586 | A1 * | 12/2008 | Lee et al. ....................... 380/210 |

FOREIGN PATENT DOCUMENTS

| JP | 11-177956 | 7/1999 |
| JP | 2003-533060 A | 11/2003 |
| JP | 2005-151333 | 6/2005 |
| WO | WO 99/03268 | 1/1999 |

* cited by examiner

*Primary Examiner* — Joseph P Hirl
*Assistant Examiner* — Fred Peng
(74) *Attorney, Agent, or Firm* — Crowell & Moring LLP

(57) ABSTRACT

A digital broadcast receiving apparatus, includes: a channel information memory unit which stores the physical channel, a virtual channel, the sub channels, and scrambling information which indicates whether the sub channels are scrambled or not so as to refer the scrambling information to the sub channels; a scrambling judgment unit which judges whether the broadcast data of the sub channels, which is scanned by the scanning unit is scrambled or not; a memory control unit which stores a judgment result obtained by the scrambling judgment unit in the channel information memory unit as the scrambling information; and an updating program which updates the scrambling information in the channel information memory unit by executing the scanning unit, the scrambling judgment unit, and the memory control unit at the predetermined timing; and wherein when the judgment result obtained by the scrambling judgment unit indicates that all of the sub channels in the physical channel are scrambled, the memory control unit stores information that the physical channel is a channel which needs to be scanned when the scrambling information is updated by the updating unit.

8 Claims, 14 Drawing Sheets

DIGITAL BROADCAST RECEIVING APPARATUS

BACKGROUND OF THE INVENTION

1. Field of the Invention

The present invention relates to a digital broadcast receiving apparatus.

2. Description of the Related Arts

A digital broadcast wave includes broadcast data of a physical channel which are assigned to each of frequency band respectively, and the broadcast data of each physical channel includes broadcast data of a plurality of sub channels. Further, the digital broadcast wave includes the PSIP (Program System Information Program), and a digital broadcast receiving apparatus which generates a channel map data based on the PSIP and stores the channel map data is known. (For example, see Patent Document 1.)

Moreover, there are sub channels which can be viewed for free and sub channels in which fees are charged for viewing. Usually, a video data and an audio data of the sub channels in which fees are charged are encoded (hereinafter, scrambled) so that only person who paid the fee can view the sub channels. There is known a digital broadcast receiving apparatus that generates and stores a channel schedule which only consists of not-scrambled sub channels (for example, Patent Document 2) and a digital broadcast receiving apparatus which stores an information relating to whether the sub channels are scrambled or not-scrambled for each of the sub channels (for example, Patent Document 3).

Patent Document 1: JP-Tokuhyou-2003-533060
Patent Document 2: JP-Tokukaihei-11-177956
Patent Document 3: JP-Tokukai-2005-151333

However, although the channel map data is once generated, updating of the channel map data is needed because the scrambling information differs according to days and time slots. On the one hand, it is complicated to scan all of the physical channels for every update, and on the other hand, by merely updating the physical channels which only have the not-scrambled sub channels, the physical channels which scrambling is released cannot be updated.

SUMMARY OF THE INVENTION

An object of the present invention is to provide a digital broadcast receiving apparatus which more efficiently and unfailingly updates the channel map data which stores the information relating to whether the sub channels are scrambled or not-scrambled.

In order to achieve the aforementioned object, in accordance with a first aspect of the present invention, a digital broadcast receiving apparatus comprises:

a scanning unit which scans a broadcast data of one or more sub channels included in a broadcast data of a physical channel in a digital broadcast wave;

a channel information memory unit which stores the physical channel, a virtual channel, the sub channels, and scrambling information which indicates whether the sub channels are scrambled or not so as to refer the scrambling information to the sub channels;

a scrambling judgment unit which judges whether the broadcast data of the sub channels, which is scanned by the scanning unit is scrambled or not;

a memory control unit which stores a judgment result obtained by the scrambling judgment unit in the channel information memory unit as the scrambling information; and an updating unit which updates the scrambling information in the channel information memory unit by having the scanning unit scan only the physical channel that has a not-scrambled sub channel which is stored in the channel information memory unit and by executing the scrambling judgment unit and the memory control unit at a predetermined timing; wherein:

when the judgment result obtained by the scrambling judgment unit indicates that all of the sub channels in the physical channel are scrambled, the memory control unit stores information that the sub channels are not scrambled as the scrambling information of a predetermined sub channel of the physical channel;

and wherein the scrambling judgment unit comprises:

a first judgment unit which judges whether the broadcast data of the sub channel, which is scanned by the scanning unit is scrambled or not by referring to each of a plurality of types of scrambling determination data used for judging whether the broadcast data is scrambled or not-scrambled, the scrambling information data being included in the broadcast data of the sub channel;

a second judgment unit which judges whether the broadcast data is scrambled or not according to whether the broadcast data is decodable or not;

and wherein the memory control unit comprises:

a first memory control unit which stores information that the sub channel is not scrambled in the channel information memory unit when the first judgment unit judges that the broadcast data is not scrambled;

a second memory control unit which stores information that the sub channel is not scrambled in the channel information memory unit when the second judgment unit judges that the broadcast data is decodable;

a judgment unit which judges whether a judgment result obtained according to the first judgment unit by referring to one of the plurality of types of the scrambling determination data coincides with a judgment result obtained according to the second judgment unit or not; and a channel information memory control unit which makes the second memory control unit store the information in the channel information memory unit when the judgment unit judges that the judgment result obtained according to the first judgment unit does not coincide with the judgment result obtained according to the second judgment unit by referring to all of the types of the scrambling determination data, and makes the first memory control unit store the information in the channel information memory unit by referring to the one of the plurality of types of the scrambling determination data when the judgment unit judges that the judgment result obtained according to the first judgment unit by referring to the one of the plurality of types of scrambling determination data coincides with the judgment result obtained according to the second judgment unit.

According to the first aspect of the present invention, whether the broadcast data of the sub channel that is scanned by the scanning unit is scrambled or not is judged by the scrambling judgment unit. The judgment result obtained by the scrambling judgment unit is stored in the channel information memory unit as the scrambling information by the memory control unit. The updating unit executes the scanning unit, the scrambling judgment unit, and the memory control unit at the predetermined timing and the scrambling information in the channel information memory unit is updated. When the judgment result obtained by the scrambling judgment unit indicates that all of the sub channels in the physical channel are scrambled, the memory control unit stores information in the channel information memory unit that this physical channel is a channel which needs to be scanned when the scrambling information is updated by the updating unit. Therefore, the scrambling information is updated without scanning all of the physical channels. Thus, the scrambling information can be updated efficiently, and the scrambling information of the physical channel which the scrambling is newly released can be updated unfailingly.

Further, when the judgment result obtained by the scrambling judgment unit indicates that all of the sub channels in the physical channel are scrambled, the memory control unit stores information that the sub channels are not scrambled as the scrambling information of the predetermined sub channel of this physical channel. Therefore, the scrambling information of the physical channel which scrambling is newly released can be updated without making any changes to the existing updating unit which makes the scanning unit scan only the physical channels having not-scrambled sub channels that are stored in the channel information memory unit at the predetermined timing. Thus, efficient and unfailing updating of the scrambling information can be easily realized.

Moreover, whether the broadcast data of the sub channel that is scanned by the scanning unit is scrambled or not is judged by referring to each of a plurality of types of scrambling determination data used for judging whether scrambled or not-scrambled which are included in the same broadcast data according to the first judgment unit. Whether the broadcast data is scrambled or not is judged according to whether this same broadcast data is decodable or not by the second judgment unit. When the first judgment unit judges that the broadcast data is not scrambled, information that this sub channel is not scrambled is stored in the channel information memory unit by the first memory control unit. When the second judgment unit judges that the broadcast data is decodable, information that the sub channel is not scrambled is stored in the channel information memory unit by the second memory control unit. Whether the judgment result obtained according to the first judgment unit by referring to one of a plurality of types of the scrambling determination data coincides with the judgment result obtained according to the second judgment unit or not by the judgment unit. The channel information memory control unit controls so as the scrambling information is stored in the channel information memory unit according to the second memory control unit when the judgment unit judges that the judgment result obtained according to the first judgment unit does not coincide with the judgment result obtained according to the second judgment unit by referring to all of the types of the scrambling determination data. The channel information memory control unit controls so as the scrambling information is stored in the channel information memory unit according to the first memory control unit by referring to one of a plurality of types of the scrambling determination data when the judgment unit judges that the judgment result obtained according to the first judgment unit by referring to the same scrambling determination data coincides with the judgment result obtained according to the second judgment unit. Therefore, whether the broadcast data is scrambled or not can be judged more accurately based on the scrambling determination data accurately reflecting whether the broadcast data is scrambled or not which is detected by referring to a plurality of types of the scrambling determination data. Also, when whether the broadcast data is scrambled or not cannot be judged accurately by referring to a plurality of types of the judgment determination data, whether the broadcast data is scrambled or not can be judged more accurately according to whether the broadcast data is decodable or not. Thus, the scrambling information can be stored in the channel information memory unit while confirming whether the broadcast data is scrambled or not more accurately.

Further, when the scrambling determination data which accurately reflects whether the broadcast data is scrambled or not is detected, the scrambling information is stored in the channel information memory unit without judging whether the broadcast data is decodable or not. Thus, the scrambling information can be stored in the channel information memory unit sooner.

In accordance with the second aspect of the present invention, a digital broadcast receiving apparatus comprises:

a scanning unit which scans a broadcast data of one or more sub channels included in a broadcast data of a physical channel in a digital broadcast wave;

a channel information memory unit which stores the physical channel, a virtual channel, the sub channels, and scrambling information which indicates whether the sub channels are scrambled or not so as to refer the scrambling information to the sub channels;

a scrambling judgment unit which judges whether the broadcast data of the sub channels, which is scanned by the scanning unit is scrambled or not;

a memory control unit which stores a judgment result obtained by the scrambling judgment unit in the channel information memory unit as the scrambling information; and an updating program which updates the scrambling information in the channel information memory unit by executing the scanning unit, the scrambling judgment unit, and the memory control unit at the predetermined timing; and wherein when the judgment result obtained by the scrambling judgment unit indicates that all of the sub channels in the physical channel are scrambled, the memory control unit stores information that the physical channel is a channel which needs to be scanned when the scrambling information is updated by the updating unit.

According to the second aspect of the present invention, whether a broadcast data of the sub channel that is scanned by the scanning unit is scrambled or not is judged by the scrambling judgment unit. The judgment result obtained by the scrambling judgment unit is stored in the channel information memory unit as the scrambling information by the memory control unit. The scrambling information in the channel information memory unit is updated by executing the scanning unit, the scrambling judgment unit, and the memory control unit at the predetermined timing by the updating program. When the judgment result obtained by the scrambling judgment unit indicates that all of the sub channels in the physical channel are scrambled, the memory control unit stores information that this physical channel is a channel which needs to be scanned when the scrambling information is updated by the updating unit. Therefore, the scrambling information in the channel information memory unit is updated without scanning all of the physical channels. Thus, the scrambling information in the channel information memory unit can be updated efficiently, and the scrambling information of the physical channel which scrambling is newly released can be updated unfailingly.

Preferably, the updating unit makes the scanning unit scan only the physical channel which has a not-scrambled sub channel stored in the channel information memory unit at a predetermined timing; and when the judgment result obtained by the scrambling judgment unit indicates that all of the sub channels in the physical channel are scrambled, the memory control unit stores information that the sub channels are not scrambled as the scrambling information of a predetermined sub channels of the physical channel.

In the present invention, the same effects as the second aspect can be achieved. Particularly, when the judgment result obtained by the scrambling judgment unit indicates that all of the sub channels in the physical channel are scrambled, the memory control unit stores information that the sub channels are not scrambled as the scrambling information of the predetermined sub channels of the physical channel. Therefore, the scrambling information of the physical channel which scrambling is newly released can be updated without making any changes to the existing updating unit which scans only the physical channel having a not-scrambled sub channel that is stored in the channel information memory unit by the scanning unit at the predetermined timing. Thus, more efficient and unfailing update of the scrambling information can be realized more easily.

Preferably, the digital broadcast receiving apparatus comprises:

a channel tuning unit which tunes a channel up/down;

a channel judgment unit which judges whether the channel tuned up/down by the channel tuning unit is scrambled or not based on the scrambling information stored in the channel information memory unit; and a skipping unit which skips the channel tuned up/down by the channel tuning unit when the channel judgment unit judges that the channel is scrambled.

In the present invention, the same effects as the second aspect can be achieved. Particularly, a channel is tuned up/down by the channel tuning unit, whether the channel tuned up/down by the channel tuning unit is scrambled or not is judged based on the scrambling information stored in the channel information memory unit by the channel judgment unit, and the channel tuned up/down by the channel tuning unit is skipped by the skipping unit when the channel judgment unit judges that the channel is scrambled. Therefore, the up/down tuning of the channel is done while the scrambled channels which cannot be viewed are automatically skipped. Thus, only the not-scrambled channels which can be viewed can be tuned up/down more effectively.

Preferably, the digital broadcast receiving apparatus comprises:

a channel tuning unit which tunes a channel up/down;

a channel judgment unit which judges whether the channel tuned up/down by the channel tuning unit is scrambled or not based on the scrambling information stored in the channel information memory unit; and an announcement unit which makes a predetermined announcement when the channel judgment unit judges that the channel tuned up/down is scrambled.

In the present invention, the same effects as the second aspect can be achieved. Particularly, a channel is tuned up/down by the channel tuning unit, whether the channel tuned up/down by the channel tuning unit is scrambled or not is judged based on the scrambling information stored in the channel information memory unit by the channel judgment unit, and a predetermined announcement is made by the announcement unit when the channel judgment unit judges that the channel tuned up/down by the channel tuning unit is scrambled. Therefore, a user can be prevented from mistaking the tuning as breakdown even when the scrambled channel is tuned by the up/down tuning.

Preferably, the digital broadcast receiving apparatus comprises:

a channel tuning unit which directly tunes a channel;

a channel judgment unit which judges whether the channel which is directly tuned by the channel tuning unit is scrambled or not based on the scrambling information stored in the channel information memory unit;

a switching unit which switches to a not-scrambled sub channel when the not-scrambled sub channel is searched and detected within the same physical channel as the tuned channel in case that the channel judgment unit judges that the channel which is directly tuned by the channel tuning unit is scrambled.

In the present invention, the same effects as the second aspect can be achieved. Particularly, a channel is tuned directly by the channel tuning unit, whether the channel which is directly tuned by the channel tuning unit is scrambled or not is judged based on the scrambling information stored in the channel information memory unit by the channel judgment unit, and the channel is switched to a not-scrambled sub channel when a not-scrambled sub channel is searched and detected within the same physical channel in case that the channel judgment unit judges that the channel which is directly tuned by the channel tuning unit is scrambled. The not-scrambled sub channel within the same physical channel is tuned automatically even when the scrambled sub channel which cannot be viewed is directly tuned and the tuning to the scrambled sub channel which cannot be viewed can be prevented. Thus, only the not-scrambled channels which can be viewed can be directly tuned more effectively.

Preferably, the digital broadcast receiving apparatus comprises:

a channel tuning unit which directly tunes a channel;

a channel judgment unit which judges whether the channel which is directly tuned by the channel tuning unit is scrambled or not based on the scrambling information stored in the channel information memory unit; and an announcement unit which makes a predetermined announcement when the channel judgment unit judges that the channel which is directly tuned by the channel tuning unit is scrambled.

In the present invention, the same effects as the second aspect can be achieved. Particularly, a channel is tuned directly by the channel tuning unit, whether the channel which is directly tuned by the channel tuning unit is scrambled or not is judged based on the scrambling information stored in the channel information memory unit by the channel judgment unit, and a predetermined announcement is made by the announcement unit when the channel judgment unit judges that the channel which is directly tuned by the channel tuning unit is scrambled. Therefore, a user can be prevented from mistaking the tuning for a breakdown even when the scrambled channel is tuned directly.

Preferably, in the digital broadcast receiving apparatus, the scrambling judgment unit judges whether the broadcast data of the sub channels, which is scanned by the scanning unit is scrambled or not by referring to each of a plurality of types of scrambling determination data used for judging whether the broadcast data is scrambled or not-scrambled, the scrambling determination data being included in the broadcast data of the sub channel.

In the present invention, the same effects as the second aspect can be achieved. Particularly, the scrambling judgment unit judges whether the broadcast data of the sub channels, which is scanned by the scanning unit is scrambled or not by referring to each of a plurality of types of scrambling determination data used for judging whether the broadcast data is scrambled or not-scrambled, the scrambling determination data being included in the same broadcast data of the sub channel. Therefore, the above described process can be processed preferably even when the scrambling determination data used to judge whether each of the broadcast data is scrambled or not is different.

Preferably, in the digital broadcast receiving apparatus, the scrambling judgment unit judges whether the broadcast data of the physical channel is scrambled or not according to whether a program association table data included in the broadcast data of the physical channel is scrambled or not.

In the present invention the same effects as the second aspect can be achieved. Particularly, the scrambling judgment unit judges whether the broadcast data of the physical channel is scrambled or not according to whether a program association table data included in the broadcast data of the same physical channel is scrambled or not. Therefore, whether all of the broadcast data of the physical channel are scrambled or not is judged by only referring to the PAT (Program Association Table) data. Thus, the judgment of scrambled or not-scrambled can be made more effectively.

BRIEF DESCRIPTION OF THE DRAWINGS

The present invention will become more fully understood from the detailed description given herein below and the accompanying drawing which are given by way of illustration only, and thus are not intended as a definition of the limits of the present invention, and wherein.

DETAILED DESCRIPTION OF PREFERRED EMBODIMENT

The preferred embodiments of the digital broadcast receiving apparatus according to the present invention will be described below with reference to the accompanying drawings.

First Embodiment

Figure 1:
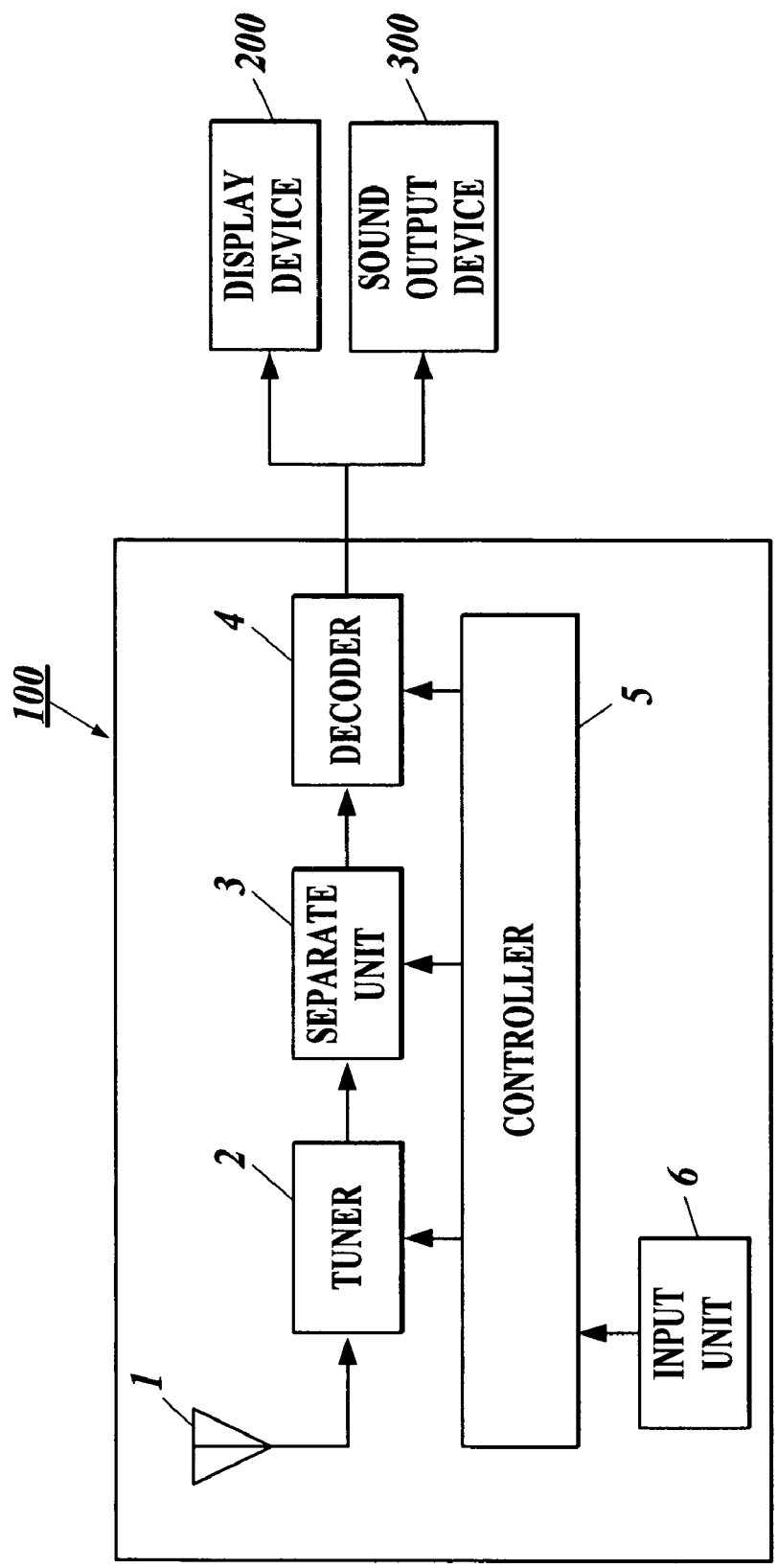
FIG. 1 is a block diagram showing a main configuration of a digital broadcast receiving apparatus according to the present invention.

First, configuration of the digital broadcast receiving apparatus 100 according to the first embodiment of the present invention is described. The digital broadcast receiving apparatus according to the present invention comprises an antenna 1, a tuner 2, a separate unit 3, a decoder 4, a controller 5, an input unit 6, and the like as shown in FIG. 1.

Further, the digital broadcast receiving apparatus 100 is connected to a display device 200 and a sound output device 300.

The antenna 1 is a parabola antenna, an UHF antenna, or the like and receives the digital broadcast wave and outputs the RF (Radio Frequency) signal to the tuner 2. When the antenna 1 receives the digital broadcast wave via a CATV line, a connecting cable (omitted from the drawings) or the like may be provided instead of the antenna 1. Further, for example, the broadcast data of the physical channel which is included in the digital broadcast wave is multiplexed by MPEG2-TS system.

The tuner 2, for example, comprises a mixer (omitted from the drawings), a channel tuning circuit (omitted from the drawings), a reverse interleave circuit (omitted from the drawings), an error correction circuit (omitted from the drawings), a demodulation circuit (omitted from the drawings), and the like. In the tuner 2, the IF(Intermediate Frequency) signal of the physical channel which is requested by a user is generated by the mixer, the channel tuning circuit, and the like, from the RF signal input from the antenna 1. In addition, in the tuner 2, an error correction process and a demodulation process and the like are performed for the generated IF signal by the reverse interleave circuit, the error correction circuit, and the demodulation circuit, and the like and the IF signal is converted to the TS (Transport Stream) signal as the broadcast wave. The TS signal generated in the tuner 2 is output to the separate unit 3.

The separate unit 3, for example, is connected to the tuner 2, the decoder 4, and the like. The separate unit 3 separates the TS signal input from the tuner 2 to a video data, an audio data, and a PSI/SI (Program Specification/Service Information) and outputs them to the decoder 4.

The decoder 4 decodes the video data and the audio data which are input from the separate unit 3 and outputs them to the display device 200 and the sound output device 300.

Figure 2:
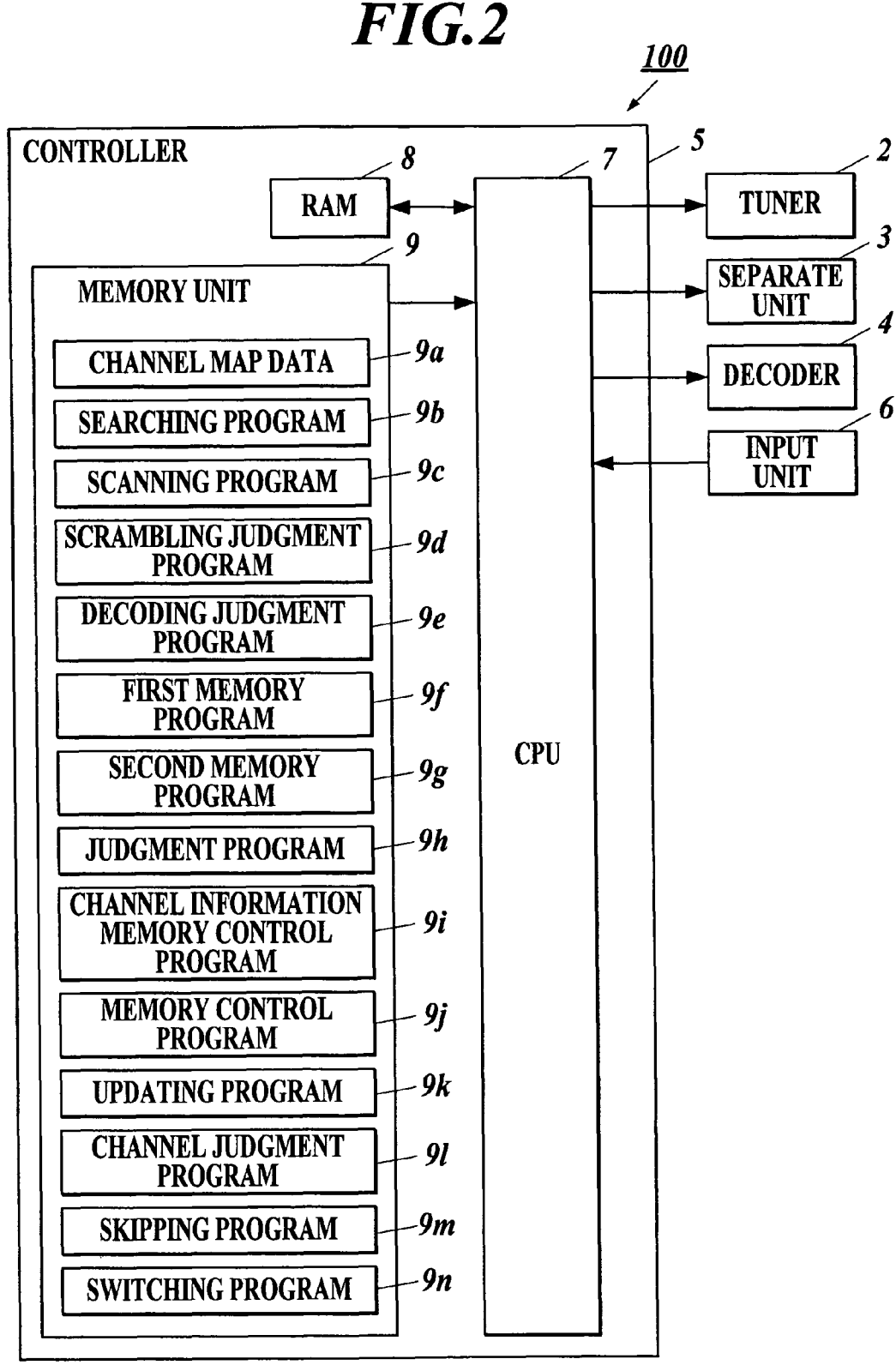
FIG. 2 is a block diagram showing the relations between the controller and each section according to the first embodiment of the present invention.

The controller 5 comprises a CPU (Central Processing Unit) 7, a RAM (Random Access Memory) 8, a memory unit 9, and the like as shown in FIG. 2. The controller 5 is connected to the tuner 2, the separate unit 3, the decoder 4, the input unit 6, and the like and controls each section of the digital broadcast receiving apparatus 100.

The CPU 7 controls the entire digital broadcast receiving apparatus 100 by reading the processing program and the like which are stored in the memory unit 9, and expanding and executing the programs in the RAM 8.

The RAM 8 expands the processing program and the like which was executed by the CPU 7 in the program storage area within the RAM 8. The RAM 8 also stores the processing results and the like which are obtained when the input data and the processing program are executed, in the data storage area.

The memory unit 9, for example, includes a recording medium (omitted from the drawings) in which programs and data and the like are stored beforehand, and this recording medium, for example, comprises a semiconductor memory and the like. Further, the memory unit 9 stores various types of data, various types of processing programs, data which was processed when the processing programs were executed and the like in order to make the CPU 7 have a function to control the entire digital broadcast receiving apparatus 100. More particularly, the memory unit 9 stores, for example, a channel map data 9*a*, a searching program 9*b*, a scanning program 9*c*, a scrambling judgment program 9*d*, decoding judgment program 9*e*, a first memory program 9*f*, a second memory program 9*g*, a judgment program 9*h*, a channel information memory control program 9*i*, a memory control program 9*j*, an updating program 9*k*, a channel judgment program 9*l*, a skipping program 9*m*, a switching program 9*n*, and the like.

Figure 3:
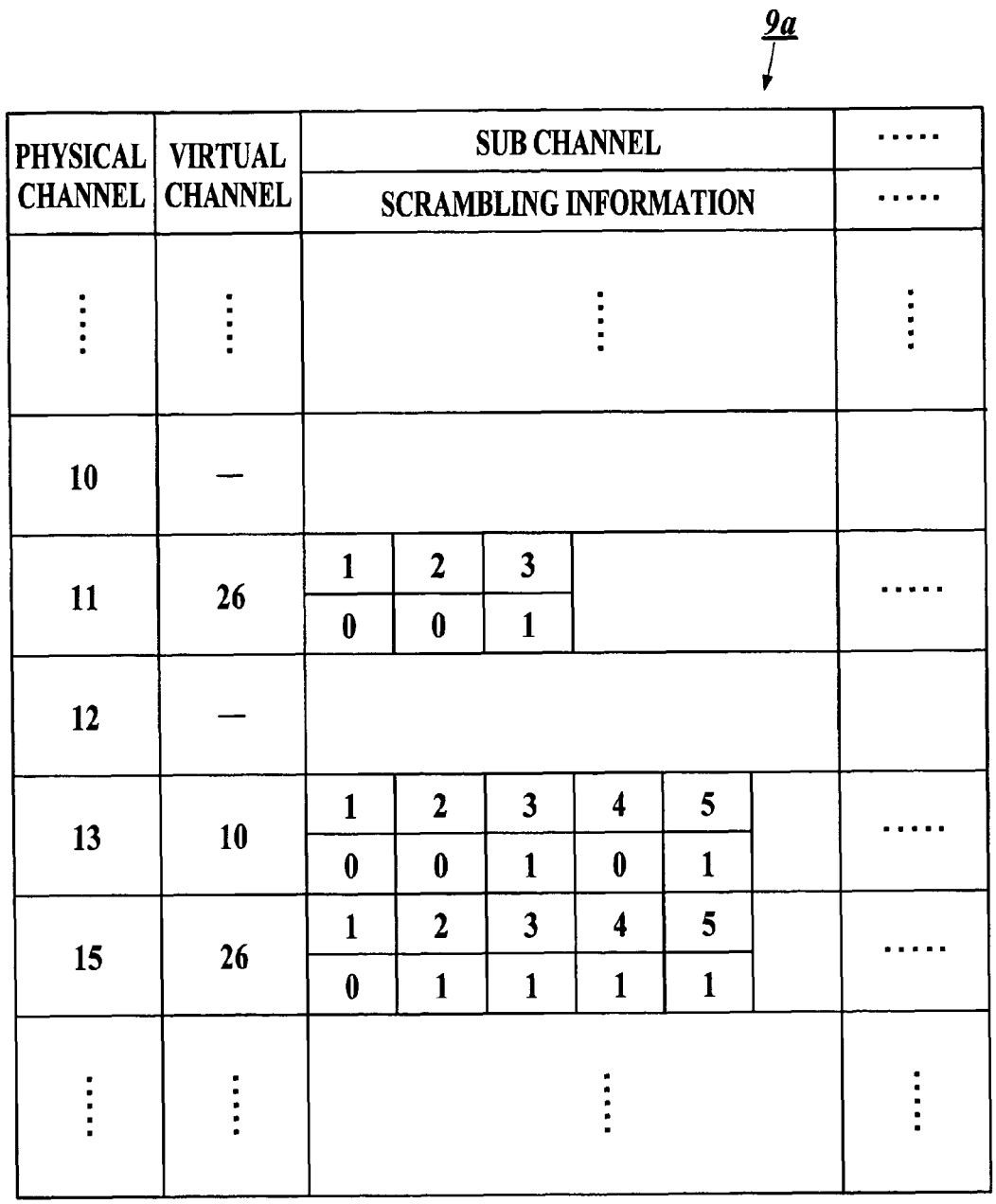
FIG. 3 is a view showing a channel map data according to the present invention.
Figure 4:
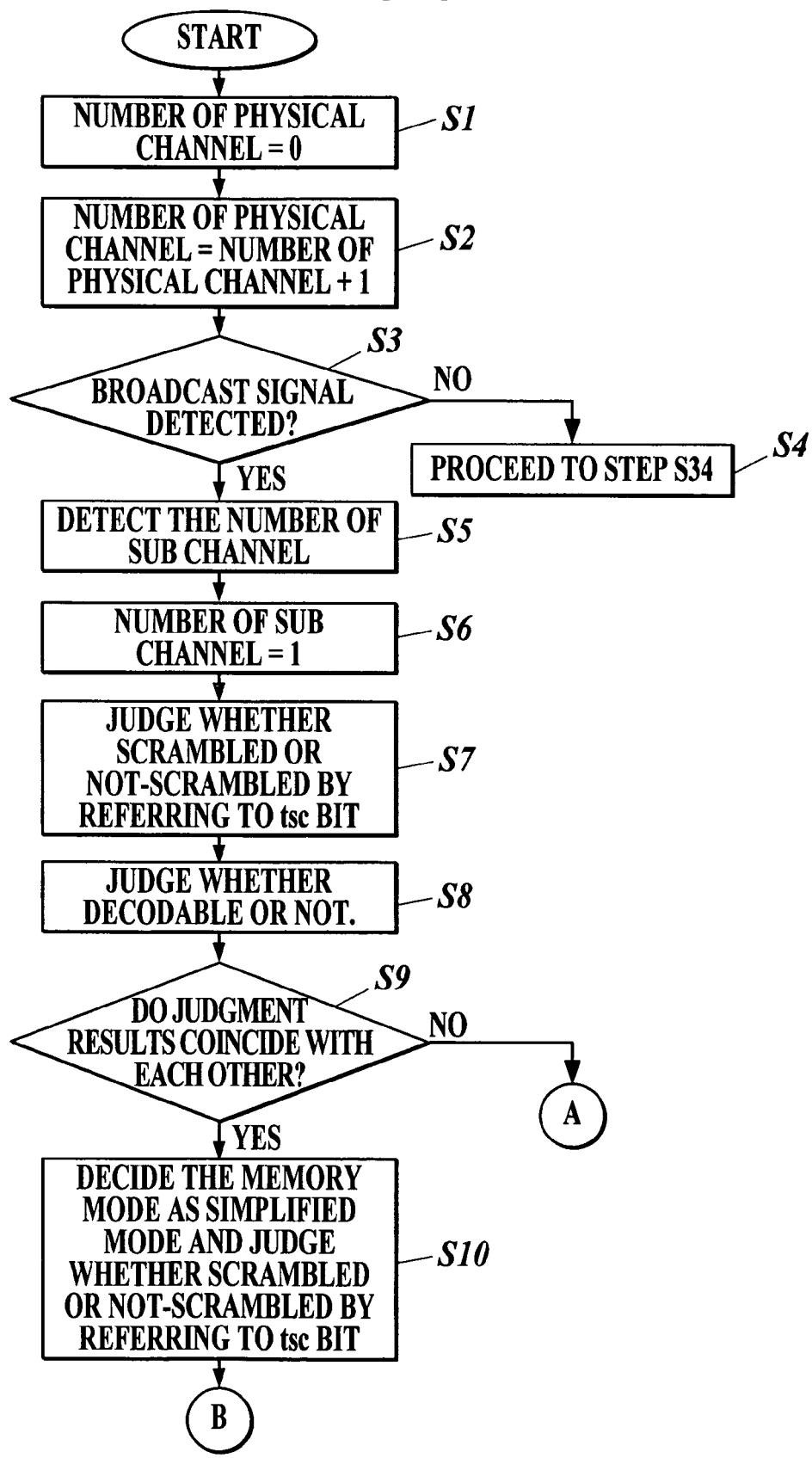
FIG. 4 is a flowchart describing memory operation of scrambling information of a digital broadcast receiving apparatus according to the present invention.
Figure 5:
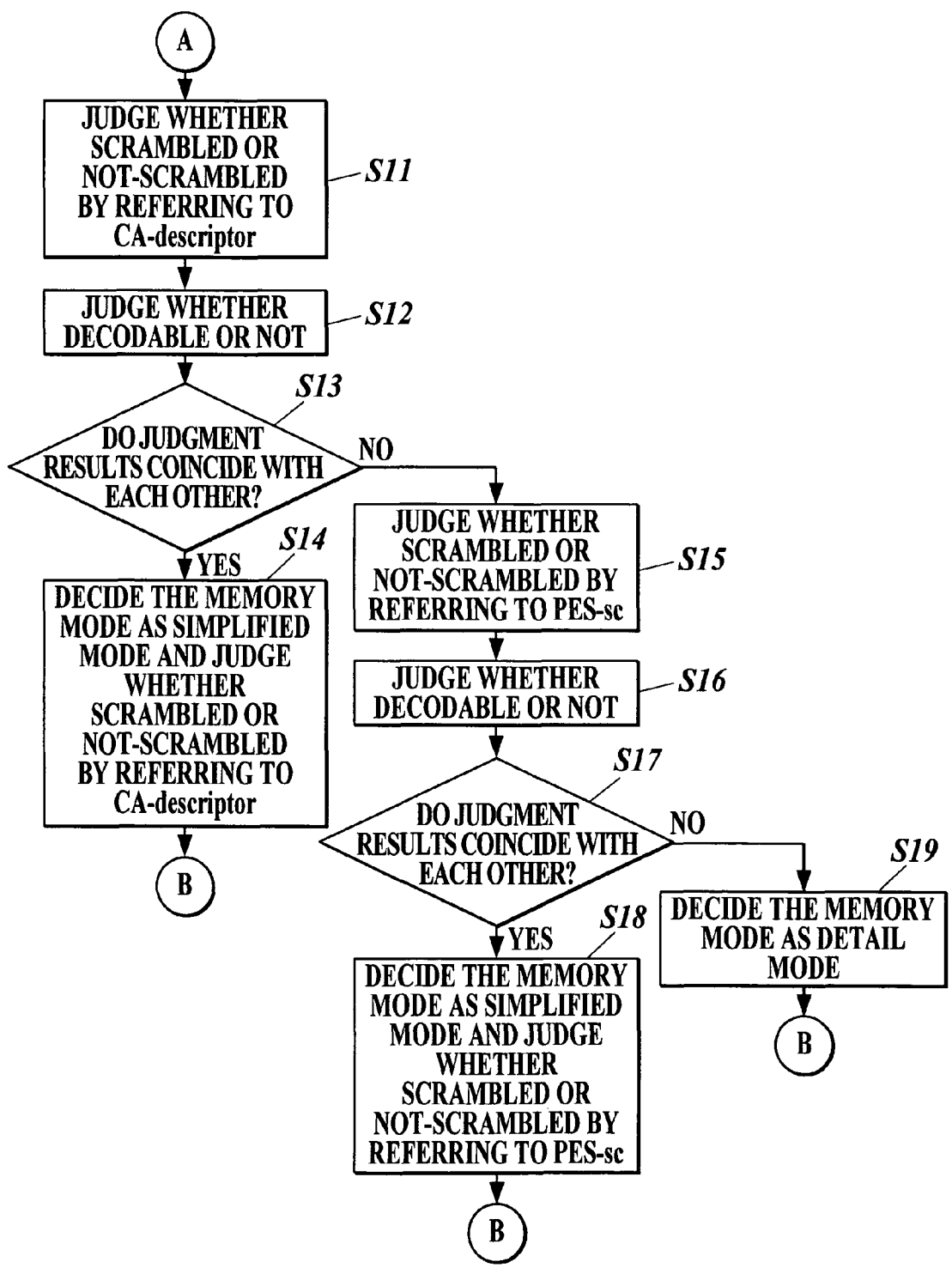
FIG. 5 is a flowchart describing memory operation of scrambling information of a digital broadcast receiving apparatus according to the present invention.
Figure 6:
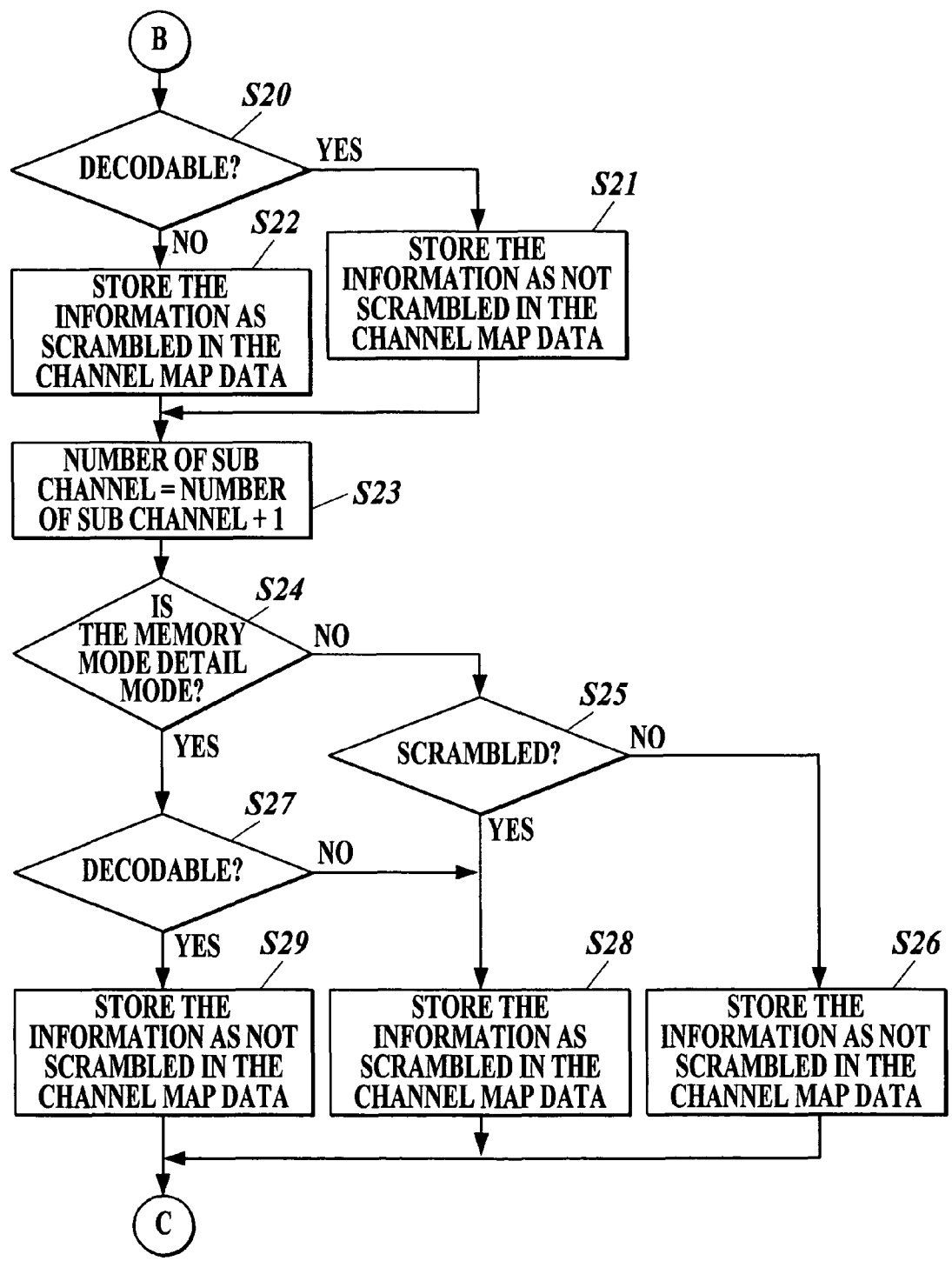
FIG. 6 is a flowchart describing memory operation of scrambling information of a digital broadcast receiving apparatus according to the present invention.
Figure 7:
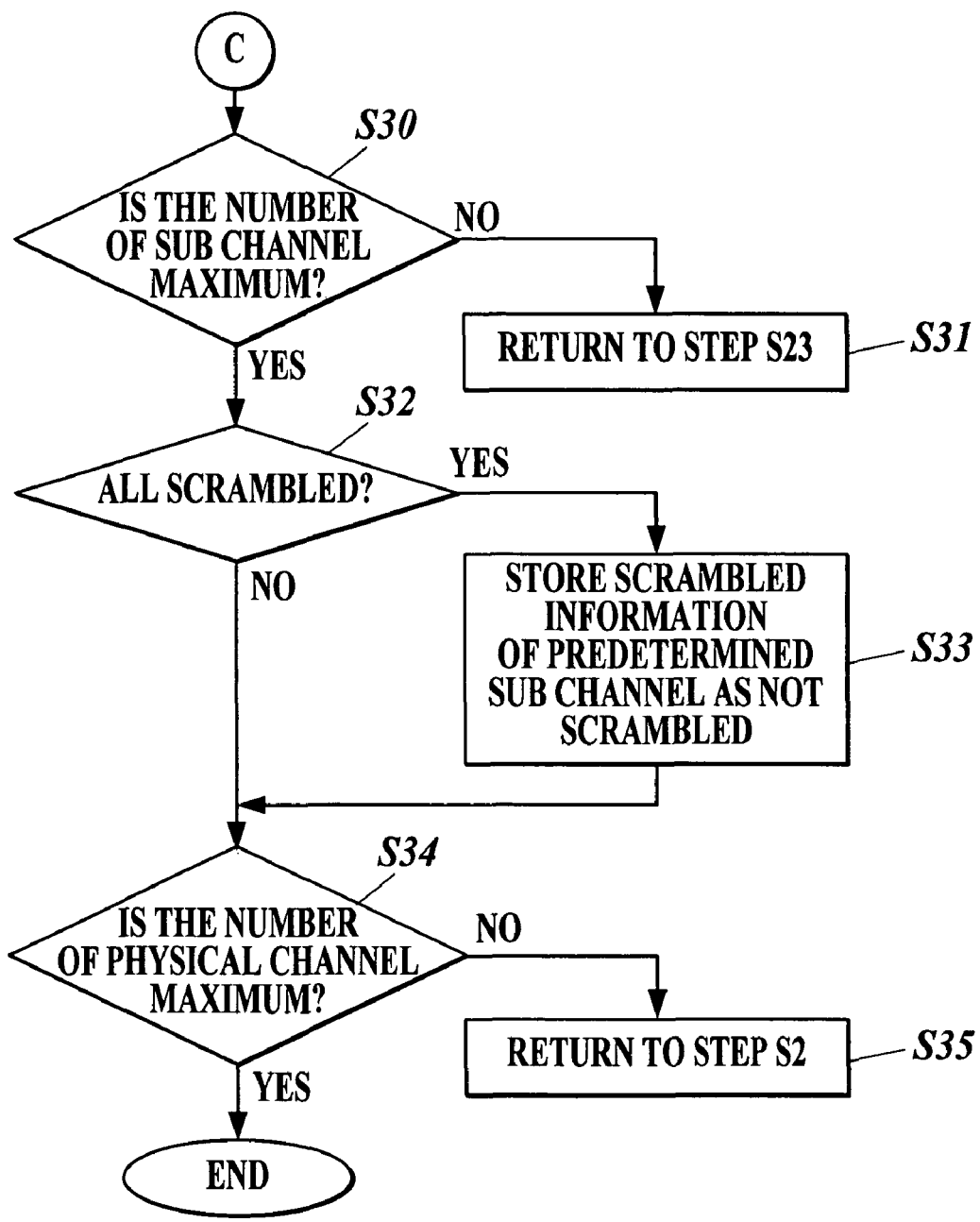
FIG. 7 is a flowchart describing memory operation of scrambling information of a digital broadcast receiving apparatus according to the present invention.

The channel map data 9*a*, for example, is a data to which the physical channel, the virtual channel, the sub channels, and the scrambling information which shows whether the sub channels are scrambled or not and the like are referred as shown in FIG. 3. More specifically, for example, in the scrambling information, the information is stored as "1" when the sub channel has been scrambled, and the information is stored as "0" when the sub channel is not scrambled for each of the sub channels. The same virtual channel can be referred to different physical channel. The virtual channel is not assigned to physical channel having no broadcast data. The memory unit 9 functions as a channel information memory unit by storing the channel map data 9*a*.

The searching program 9*b*, for example, is a program which makes the CPU 7 have a function to control the tuner 2 to search the full range of the RF signal input from the antenna 1 and convert the RF signal to the IF signal of the physical channel, and then convert the IF signal to TS signal of the predetermined physical channel.

The scanning program 9*c*, for example, is a program which makes the CPU 7 have a function to scan the broadcast data which is included in the TS signal which is generated by the tuner 2. The CPU 7 functions as a scanning unit by executing above-described scanning program 9*c*.

The scrambling judgment program 9*d*, for example, is a program which makes the CPU 7 have a function to judge whether the broadcast data of the sub channel that is scanned by the scanning unit is scrambled or not by referring to each of a plurality of types of scrambling determination data used for judging whether this broadcast data is scrambled or not-scrambled, which are included in this broadcast data. Here, the scrambling determination data is one of, for example, a tsc (transport scrambling control) bit which is included in the header area of the video data of the broadcast data of the sub channel, a descriptior_tag within PMT (Program Map Table), and a PES (Packetized Elementary Stream)_scrambling_control which is included in the video data and/or the audio data. The CPU 7 functions as a part of the first judgment unit and the scrambling judgment unit by executing above-described scrambling judgment program 9*d*.

More particularly, the CPU 7 judges that the broadcast data is scrambled when the value of the tsc bit is "01", "10", and "11", and the CPU 7 judges that the aforementioned broadcast data is not scrambled when the value of the tsc bit is "00" by referring to the tsc bit which is 2 bit field that complies with "Semantic definition of fields in Transport Stream packet layer" in 2.4.3.3 section of ISO/IEC 13818/1.

In addition, there is a descriptor which complies with the syntax of "Semantic definition of fields in program and program element descriptors" in 2.6.1 section of ISO/IEC 13818•1 within PMT which complies with the syntax of "Semantic definition of fields in Transport Stream program map section" in 2.4.4.9 section of ISO/IEC 13818•1. Further, the CPU 7 judges that the broadcast data is scrambled when the description_tag which is the value within the syntax indicates the value of "0×09", i.e. CA (Conditional Access)-descriptor, and the CPU 7 judges that this same broadcast data is not scrambled when this descriptor_tag indicates the value other than "0×09".

Further, the CPU 7 judges that the broadcast data is scrambled when the value of PES_scrambling_control is "01", "10", "11", and the CPU 7 judges that the broadcast data is not scrambled when the value of PES_scrambling_control is "00" by referring to PES_scrambling control which is 2 bit field that complies with "Semantic definition of fields in PES packet" in 2.4.3.7 section of ISO/IEC 13818•1.

The decoding judgment program 9*e*, for example, is a program which makes the CPU 7 have a function to control the decoder 4 to decode the scanned broadcast data of the sub channel and judge whether the broadcast data is scrambled or not by referring to whether the broadcast data is decodable or not. Here, for example, the CPU 7 functions as a part of the second judgment unit and a part of the scrambling judgment unit by executing the above-described decoding judgment program 9*e*.

The first memory program 9*f*, for example, is a program which makes the CPU 7 have a function to store information that the sub channel is not scrambled in the channel map data 9*a* when the broadcast data of the sub channel is judged as not scrambled according to the execution of the scrambling judgment program 9*d*. The CPU 7 functions as the first memory control unit by executing the above-described first memory program 9*f*.

The second memory program 9*g*, for example, is a program which makes the CPU 7 have a function to store information that the sub channel is not scrambled in the channel map data 9*a* when the broadcast data is judged as decodable according to the execution of the decoding judgment program 9*e*. The CPU 7 functions as the second memory control unit by executing the above-described second memory program 9*g*.

The judgment program 9*h*, for example, is a program which makes the CPU 7 have a function to judge whether the judgment result obtained by referring to one of a plurality of types of the scrambling determination data according to the execution of the scrambling judgment program 9*d* coincides with the judgment result obtained by the execution of the decoding judgment program 9*e* or not. The CPU 7 functions as the judgment unit by executing the above-described judgment program 9*h*.

The channel information memory control program 9*i*, for example, is a program which makes the CPU 7 have a function to store information in the channel map data 9*a* by executing the second memory program 9*g* when it is judged that the judgment result obtained by the execution of the scrambling judgment program 9*d* and the judgment result obtained by the execution of the decoding judgment program 9*e* do not coincide with all of the types of the scrambling determination data by executing the judgment program 9*h* (detail mode). Further, the channel information memory control program 9*i*, for example, is a program which makes the CPU 7 have a function to store information in the channel map data 9*a* by executing the first memory program 9*f* by referring to one of the various types of the scrambling determination data according to the execution of the scrambling judgment program 9d when it is judged that the judgment result obtained by referring to the scrambling determination data described above coincides with the judgment result obtained by the execution of decoding judgment program 9e (simplified mode). The CPU 7 functions as the channel information memory control unit by executing the above-described channel information memory control program 9i.

The memory control program 9j, for example, is a program which makes the CPU 7 have a function to store information that the physical channel is a channel which needs to be scanned at the time of the execution of the after-mentioned updating program 9k in the channel map data 9a when it is judged that all of the sub channels of this same physical channel are scrambled by executing the scrambling judgment program 9d and the decoding program 9e. More particularly, the memory control program 9j, for example, is a program which makes the CPU 7 have a function to store information that the sub channels are not scrambled as the scrambling information of the predetermined sub channels of the physical channel when all of the sub channels of this same physical channel are judged as scrambled by executing the scrambling judgment program 9d and the decoding judgment program 9e.

For example, as shown in FIG. 3, the CPU 7 stores the scrambling information of the predetermined sub channel of the physical channel 15, for example sub channel 1, as "0" in the channel map data 9a when all of the sub channels within the physical channel 15 are judged as scrambled by executing the memory control program 9j.

The CPU 7 functions as the memory control unit by executing the above-described memory control program 9j.

The updating program 9k, for example, is a program which makes the CPU 7 have a function to update the scrambling information of the channel map data 9a by executing the scanning program 9c, the scrambling judgment program 9d, the decoding judgment program 9e, the first memory program 9f, the second memory program 9g, the judgment program 9h, the channel information memory control program 9i, and the memory control program 9j at the predetermined timing. More specifically, the updating program 9k, for example, is a program which makes the CPU 7 have a function to scan only the physical channel which has not-scrambled sub channel that is stored in the channel map data 9a by executing the scanning program 9c at the predetermined timing, and to update the scrambling information of the sub channels of the scanned physical channel by executing the scrambling judgment program 9d, the decoding judgment program 9e, the first memory program 9f, the second memory program 9g, the judgment program 9h, the channel information memory control program 9i, and the memory control program 9j. The CPU 7 functions as the updating unit by executing the above-described updating program 9k.

Here, the predetermined timing is, for example, the timing when the power is turned on, a fixed time, a standby time (for example, when the power is off while the main power is on) or the like.

The channel judgment program 9l, for example, is a program which makes the CPU 7 have a function to judge whether the channel which was tuned by the after-mentioned input unit 6 is scrambled or not on the basis of the scrambling information stored in the channel map data 9a. The CPU 7 functions as the channel judgment unit by executing the above-described channel judgment program 9l.

The skipping program 9m, for example, is a program which makes the CPU 7 have a function to skip the channel when the channel which was tuned up/down by the input unit 6 is judged as scrambled according to the execution of the channel judgment program 9l. The CPU 7 functions as the skipping unit by executing the above-described skipping program 9m.

The switching program 9n, for example, is a program which makes the CPU 7 have a function to switch to a sub channel which is detected by searching for the not-scrambled sub channel within the same physical channel as the directly tuned channel when the channel which was tuned directly by the input unit 6 is judged as scrambled by executing the channel judgment program 9l. The CPU 7 functions as the switching unit by executing the above-described switching program 9n.

The input unit 6 has keys and the like to input an input signal according to various types of operations to the digital broadcast receiving apparatus 100, and the input signals of various types of operation are input to the digital broadcast receiving apparatus 100 due to the operation by a user. More specifically, the input unit 6, for example, has channel up/down keys to tune up/down the channel (omitted from the drawings), number keys to directly tune the channel (omitted from the drawings) and the like, and the input unit 6 functions as a channel tuning unit by outputting the input signal to tune the channel up/down, the input signal to directly tune the channel and the like to the digital broadcast receiving apparatus 100, due to the pushing of these channel up/down keys and number keys by a user.

Next, the memory operation of the scrambling information of the digital broadcast receiving apparatus 100 having the construction described above, according to the present invention, will be explained by referring to the flowcharts shown in FIGS. 4 to 7.

First, the scrambling information memory operation signal is input due to the operation of the input unit 6 by a user. The CPU 7 initializes the number of physical channels searched by the CPU 7, which is stored in the RAM 8 at this time (the number of the physical channel=0)(step S1).

Next, the CPU 7 adds "1" to the number of the physical channel which is searched by the CPU 7 that is stored in the RAM 8 (step S2).

Next, the tuner 2 is controlled to search the full range of the RF signal input from the antenna 1 and to detect the RF signal of the physical channel having the broadcast signal according to the execution of the searching program 9b by the CPU 7 (step S3).

In step S3, when the RF signal of the physical channel having the broadcast signal is not detected by the tuner 2 (step S3; No), the process continues to step S34 (step S4).

In step S3, when the RF signal of the physical channel having the broadcast signal is detected by the tuner 2 (step S3; Yes), the CPU 7 controls the tuner 2 to detect the number of the sub channels included in the physical channel which is detected in step S3 based on the execution of the searching program 9b (step S5).

Then, the CPU 7 initializes the number of the sub channels searched by the CPU 7, which is stored in the RAM 8 (the number of the sub channel=1) (step S6).

Next, the CPU 7 converts the RF signal to the IF signal and the IF signal to the TS signal based on the execution of the searching program 9b, scans the broadcast data of the sub channel included in the TS signal by executing the scanning program 9c, and judges whether the broadcast data is scrambled or not by referring to the tsc bit by executing the scrambling judgment program 9d (step S7).

Next, the CPU 7 judges whether the broadcast data is scrambled or not according to whether the broadcast data is decodable or not by executing the decoding judgment program 9e (step S8).

Next, the CPU 7 judges whether the judgment made in step S7 coincides with the judgment made in step S8 or not by executing the judgment program 9h (step S9).

In step S9, when the CPU 7 judges that the judgment made in step S7 coincides with the judgment made in step S8 (step S9; Yes), the CPU 7 decides the scrambling information memory mode as the simplified mode by executing the channel information memory control program 9i, and decides to judge whether the broadcast data is scrambled or not by referring to the tsc bit (Step S10).

In step S9, when the CPU 7 judges that the judgment made in step S7 does not coincide with the judgment made in step S8 (step S9; No), the CPU 7 judges whether the broadcast data is scrambled or not by referring to the descriptor_tag by executing the scrambling judgment program 9d (step S11).

Next, the CPU 7 judges whether the broadcast data is scrambled or not according to whether the broadcast data is decodable or not by executing the decoding judgment program 9e (step S12).

Next, the CPU 7 judges whether the judgment made in step S11 coincides with the judgment made in step S12 or not by executing the judgment program 9h (Step S13).

In step S13, when the CPU 7 judges that the judgment made in step S11 coincides with the judgment made in step S12 (step S13; Yes), the CPU 7 decides the scrambling information memory mode as the simplified mode by executing the channel information memory control program 9i, and decides to judge whether the broadcast data is scrambled or not by referring to the descriptor_tag (step S14).

In step S13, when the CPU 7 judges that the judgment made in step S11 does not coincide with the judgment made in step S12 (step S13; No), the CPU 7 judges whether the broadcast data is scrambled or not by referring to the PES_scrambling_control, by executing the scrambling judgment program 9d (Step S15).

Next, the CPU 7 judges whether the broadcast data is scrambled or not according to whether the broadcast data is decodable or not by executing the decoding judgment program 9e (step S16).

Next, the CPU 7 judges whether the judgment made in step S15 coincides with the judgment made in step S16 or not by executing the judgment program 9h (step S17).

In step S17, when the CPU 7 judges that the judgment made in step S15 coincides with the judgment made in step S16 (step S17; Yes), the CPU 7 decides the scrambling information memory mode as the simplified mode by executing the channel information memory control program 9i, and decides to judge whether the broadcast data is scrambled or not by referring to the PES_scrambling_control (step S18).

In step S17, when the CPU 7 judges that the judgment made in step S15 does not coincide with the judgment made in step S16 (step S17; No), the CPU 7 decides the scrambling information memory mode as the detail mode by executing the channel information memory control program 9i (step S19).

Next, the CPU 7 judges whether the broadcast data of the sub channel "1" is decodable or not by referring to one of the processing results obtained in step S8, step S12, or step S16 which are stored in the RAM 8 (step S20).

In step S20, when the CPU 7 judges that the broadcast data of the sub channel "1" is decodable (step S20; Yes), the CPU 7 stores the information that this sub channel is not scrambled in the channel map data 9a (step S21).

In step S20, when the CPU 7 judges that the broadcast data of the sub channel "1" is not decodable (step S20; No), the CPU 7 stores information that this sub channel is scrambled in the channel map data 9a (step S22).

Next, the CPU 7 adds "1" to the number of the sub channel searched by the CPU 7 which is stored in the RAM 8 (step S23).

Next, the CPU 7 judges whether the scrambling information memory mode is decided as the detail mode by referring to the processing result stored in the RAM 8 (step S24).

In step S24, when the CPU 7 judges that the scrambling information memory mode is decided as the simplified mode (step S24; No), the CPU 7 judges whether the broadcast data of the sub channel included in the TS signal is scrambled or not by referring to one of the scrambling determination data by complying with the judgments made in step S10, step S14, and step S18 by executing the first memory program 9f (step S25).

In step S25, when the CPU 7 judges that the broadcast data is not scrambled (step S25; No), the CPU 7 stores the information that this sub channel is not scrambled in the channel map data 9a based on the execution of the first memory program 9f (step S26).

In step S25, when the CPU 7 judges that the broadcast data is scrambled (step S25; Yes), the process continues to step S28.

On the other hand, in step S24, when the CPU 7 judges that the scrambling information memory mode is decided as the detail mode (step S24; Yes), the CPU 7 executes the second memory program 9g and judges whether the broadcast data is decodable or not by executing the decoding judgment program 9e (step S27).

In step S27, when the CPU 7 judges that the broadcast data is not decodable (step S27; No), the CPU 7 stores the information that this sub channel is scrambled in the channel map data 9a (step S28).

In step S27, when the CPU 7 judges that the broadcast data is decodable (step S27; Yes), the CPU 7 stores the information that this sub channel is not scrambled in the channel map data 9a based on the execution of the second memory program 9g (step S29).

Next, the CPU 7 judges whether the number of the sub channels which are searched by referring to the processing results and the like stored in the RAM 8 have reached the maximum number of the channels or not (step S30).

In step S30, when the CPU 7 judges that the number of the sub channels which are searched have not reached the maximum number of the channels (step S30; No), the process returns to step S23 (step S31).

In step S30, when the CPU 7 judges that the number of the sub channels which are searched have reached the maximum number of the channels (step S30; Yes), the CPU 7 judges whether all of the sub channels included in the physical channel which is scanned in step S2 through step S30 by referring to the process results and the like stored in the RAM 8 are scrambled or not by executing the memory control program 9j (step S32).

In step S32, when the CPU 7 judges that all of the sub channels included in the scanned physical channel are scrambled (step S32; Yes), the CPU 7 stores the scrambling information of the predetermined sub channel of this physical channel as not scrambled in the channel map data 9a (step S33).

In step S32, when the CPU 7 judges that the not-scrambled sub channel is included in the scanned physical channel (step S32; No), the CPU 7 judges whether the number of the physical channels which are searched by referring to the processing results and the like stored in the RAM 8 have reached the maximum number of the physical channels or not (step S34).

In step S34, when the CPU 7 judges that the number of the physical channels which are searched have not reached the maximum number of the physical channels (step S34; No), the process returns to step S2 (step S35).

In step S34, when the CPU 7 judges that the number of the physical channels which are searched have reached the maximum number of the physical channels (step S34; Yes), the process is terminated.

Figure 8:
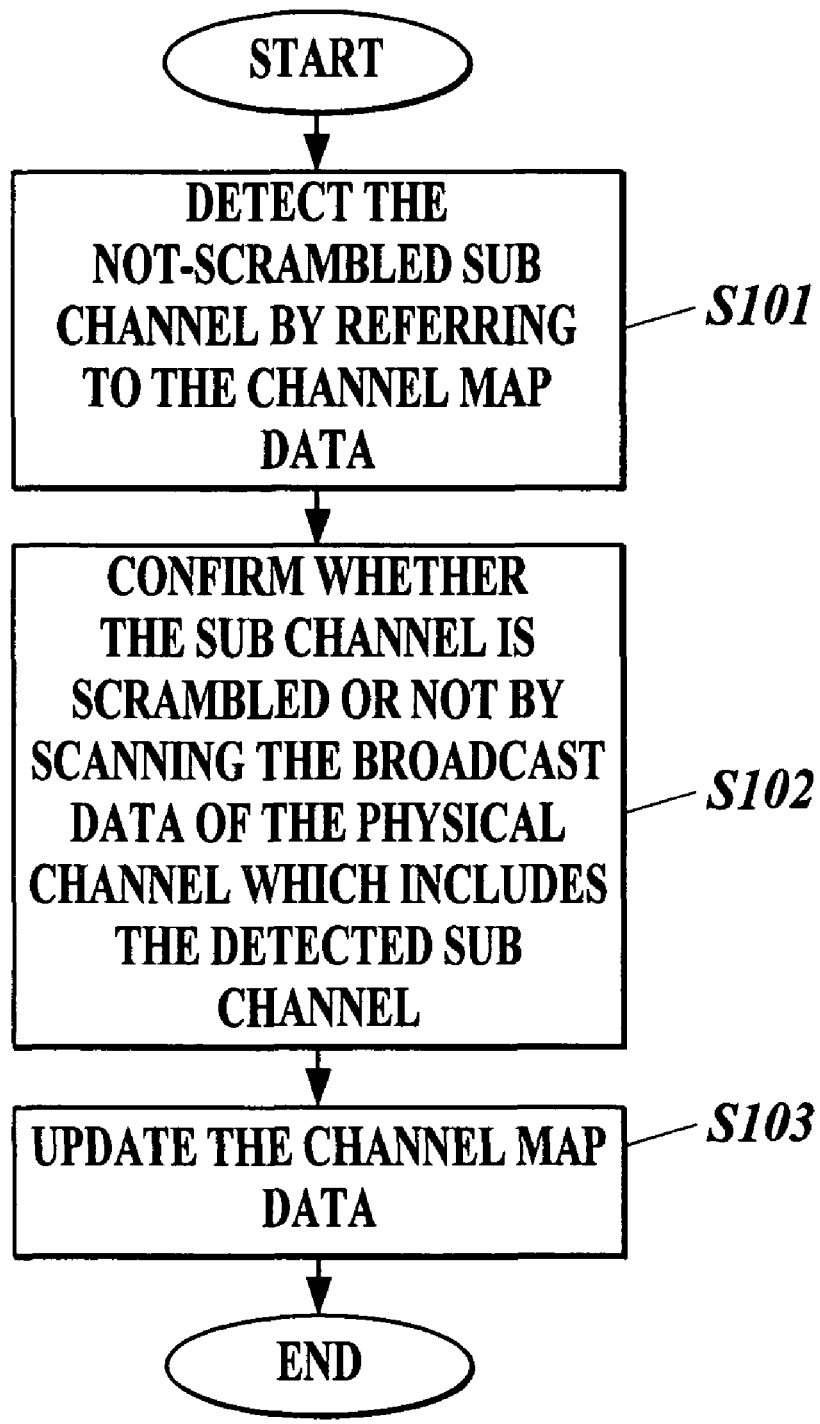
FIG. 8 is a flowchart describing update operation of scrambling information of a digital broadcast receiving apparatus according to the present invention.

Next, the updating operation of the scrambling information of the digital broadcast receiving apparatus 100 according to the present invention will be explained by referring to the flowchart shown in FIG. 8.

First, the CPU 7 detects the not-scrambled sub channel by referring to the channel map data 9a at the predetermined timing by executing the updating program 9k (step S101).

Next, the CPU 7 scans the broadcast data of the physical channel including the sub channel which was detected in step S101 by executing the scanning program 9c, and judges whether the broadcast data of the sub channel which is included in this broadcast data is scrambled or not by executing the scrambling judgment program 9d and the decoding judgment program 9e (step S102). More particularly, the same process as step S7 through step S31 in the flowchart of the memory operation for the scrambling information of the digital broadcast receiving apparatus 100 shown in FIGS. 4 through 7 is processed.

Next, the CPU 7 updates the scrambling information in the channel map data 9a based on the judgment made in the step S102 (step S103). More particularly, the same process as step S32 through step S33 in the flowchart of the memory operation for the scrambling information of the digital broadcast receiving apparatus 100 which is shown in FIGS. 4 through 7 is processed.

Figure 9:
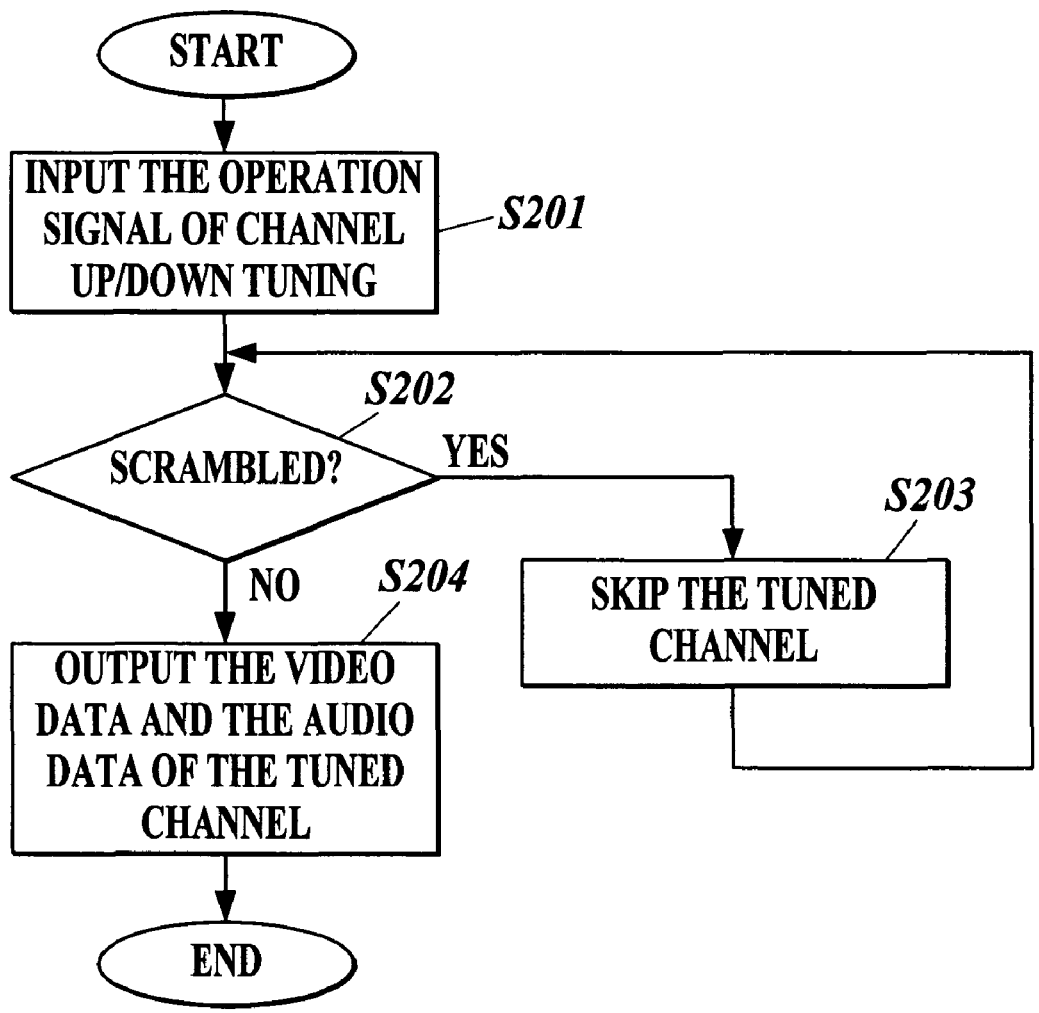
FIG. 9 is a flowchart describing channel up/down tuning operation of a digital broadcast receiving apparatus according to the present invention.

Next, the channel up/down tuning operation of the digital broadcast receiving apparatus 100 according to the present invention will be explained by referring to the flowchart shown in FIG. 9.

First, when the operation signal of the channel up/down tuning is input due to the operation of the input unit 6 by a user (step S201), the CPU 7 judges whether tuned channel is scrambled or not based on the scrambling information stored in the channel map data 9a by executing the channel judgment program 9l (step S202).

In step S202, when the CPU 7 judges that the tuned channel is scrambled (step S202; Yes), the CPU 7 skips the channel by executing the skipping program 9m and returns to step S202 (step S203).

In step S202, when the CPU 7 judges that the tuned channel is not scrambled (step S202; No), the CPU 7 outputs the video data and the audio data of the tuned channel to the display device 200 and the sound output device 300 (step S204).

Figure 10:
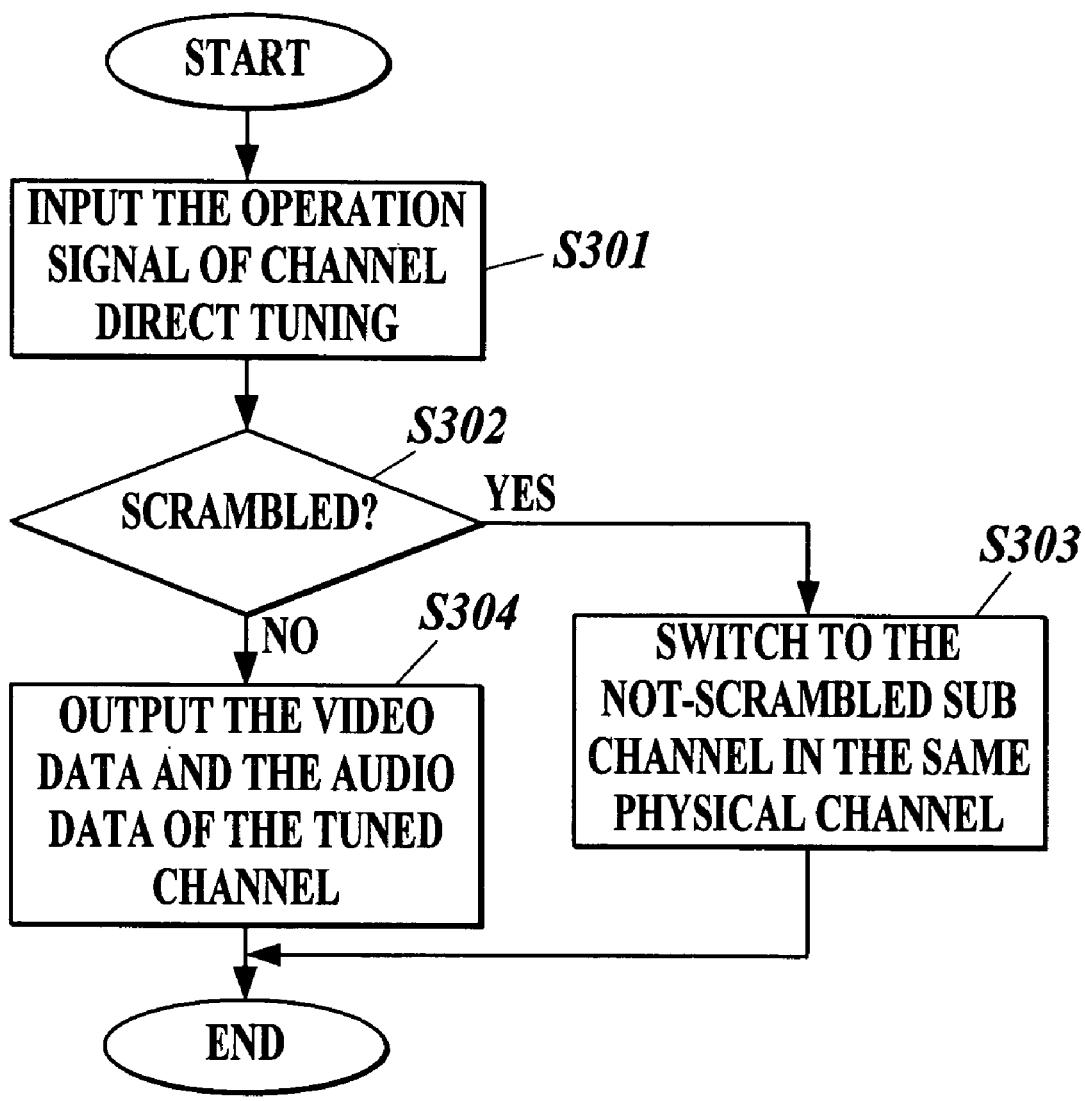
FIG. 10 is a flowchart describing direct tuning operation of a digital broadcast receiving apparatus according to the present invention.

Next, the direct tuning operation of the digital broadcast receiving apparatus 100 according to the present invention will be explained referring to the flowchart shown in FIG. 10.

First, when the operation signal of the direct tuning is input due to the operation of the input unit 6 by a user (step S301), the CPU 7 judges whether the directly tuned channel is scrambled or not based on the scrambling information stored in the channel map data 9a by executing the channel judgment program 9l (step S302).

In step S302, when the CPU 7 judges that the tuned channel is scrambled (step S302; Yes), the CPU 7 switches to a sub channel which is detected by searching for the not-scrambled sub channel within the same physical channel as the channel which is directly tuned, by executing the switching program 9n (step S303).

In step S302, when the CPU 7 judges that the directly tuned channel is not scrambled (step S302; No), the CPU 7 outputs the video data and the audio data of the tuned channel to the display device 200 and the sound output device 300 (step S304).

According to the digital broadcast receiving apparatus 100 according to the present invention described above, whether the broadcast data of the scanned sub channel is scrambled or not is judged according to the execution of the scrambling judgment program 9d and the decoding judgment program 9e by the CPU 7, and the judgment result obtained by the execution of the scrambling judgment program 9d and the decoding judgment program 9e is stored in the channel map data 9a of the memory unit 9 as the scrambling information according to the execution of the memory control program 9j by the CPU 7. Further, the scanning program 9c, the scrambling judgment program 9d, the decoding judgment program 9e, and the memory control program 9j are executed at the predetermined timing according to the execution of the updating program 9k by the CPU 7, and the scrambling information of the channel map data 9a is updated. Also, the information that the physical channel needs to be scanned at the time of updating is stored in the channel map data 9a when the judgment results obtained by the execution of the scrambling judgment program 9d and the decoding judgment program 9e indicates that all of the sub channels in this same physical channel are scrambled according to the execution of the memory controlling program 9j by the CPU 7. Therefore, the scrambling information in the channel map data 9a can be updated without scanning all of the physical channels. Thus, the scrambling information in the channel map data 9a can be updated effectively, and also the scrambling information of the physical channel in which scrambling is newly released can be updated unfailingly.

When the judgment result obtained by the execution of the scrambling judgment program 9d and the decoding judgment program 9e indicates that all of the sub channels within one physical channel are scrambled according to the execution of the memory control program 9j by the CPU 7, the information that the sub channel is not scrambled is stored as the scrambling information of the predetermined sub channel of this same physical channel. Therefore, the scrambling information of the physical channel in which scrambling is newly released can be updated without making any changes to the existing updating program 9k which scans only the physical channels which have the not-scrambled sub channel stored in the channel map data 9a at the predetermined timing. Thus, effective and unfailing update of the scrambling information in the channel map data 9a can be realized.

Further, whether the broadcast data is scrambled or not is judged by referring to each of the various types of the scrambling determination data which are used for judging whether the broadcast data is scrambled or not and which are included in the scanned broadcast data of the sub channel according to the execution of the scrambling judgment program 9d by the CPU 7. Whether the broadcast data is scrambled or not is judged according to whether the broadcast data is decodable or not by the execution of the decoding judgment program 9e by the CPU 7. The information that the sub channel is not scrambled is stored in the channel map data 9a when the broadcast data is judged as not scrambled according to the execution of the scrambling judgment program 9d by the CPU 7, by the execution of the first memory program 9f by the CPU 7. The information that the sub channel is not scrambled is stored in the channel map data 9a when the broadcast data is judged as decodable according to the execution of the decoding judgment program 9e by the CPU 7, by the execution of the second memory program 9g by the CPU 7. Whether the judgment result obtained by referring to one of the plurality of types of the scrambling information according to the execution of the scrambling judgment program 9d coincides with the judgment result obtained according to the execution of the decoding judgment program 9e or not is judged by the execution of the judgment program 9h by the CPU 7. The scrambling information is stored in the channel map data 9a by executing the second memory program 9g when the judgment result obtained by executing the scrambling judgment program 9d according to the execution of the judgment program 9h does not coincide with the judgment result obtained by executing the decoding judgment program 9e by referring to all of the types of the scrambling determination data, by the execution of the channel information memory control program 9i by the CPU 7. The scrambling information is stored in the channel map data 9a according to the execution of the first memory program 9f by referring to one of the various types of the scrambling determination data when the judgment result obtained by the scrambling judgment program 9d which refers to the same scrambling determination data coincide with the judgment result obtained by executing the decoding judgment program 9e according to the execution of the judgment program 9h. Therefore, whether the broadcast data is scrambled or not can be judged more accurately based on the scrambling determination data which accurately reflects whether the broadcast data is scrambled or not-scrambled, that is detected by referring to a plurality of types of the scrambling determination data. Also, whether the broadcast data is scrambled or not can be more accurately judged according to whether the broadcast data is decodable or not when whether the broadcast data is scrambled or not cannot be judged accurately by referring to a plurality of types of the scrambling determination data. Thus, the scrambling information can be stored in the channel map data 9a while confirming whether the broadcast data is scrambled or not more accurately.

Further, the scrambling information is stored in the channel map data 9a without judging whether the broadcast data is decodable or not when the scrambling determination data which accurately reflects whether the broadcast data is scrambled or not-scrambled is detected. Therefore, the scrambling information can be stored in the channel map data sooner.

Further, whether the broadcast data is scrambled or not is judged by referring to each of the plurality of types of the scrambling determination data which are used to judge whether this broadcast data is scrambled or not and which are included in the scanned broadcast data of the sub channel according to the execution of the scrambling judgment program 9d by the CPU 7. Therefore, the above described process can be processed preferably even when the scrambling determination data used to judge whether each of the broadcast data is scrambled or not are different from each other.

Moreover, the channel is tuned up/down by the input unit 6 and whether the channel tuned up/down by the input unit 6 is scrambled or not is judged based on the scrambling information stored in the channel map data 9a according to the channel judgment 91 executed by the CPU 7. The channel is skipped according to the execution of the skipping program 9m by the CPU 7, when the channel tuned up/down by the input unit 6 is judged as scrambled according to the execution of the channel judgment program 9l by the CPU 7. Therefore, the channel is tuned up/down while the scrambled channels which cannot be viewed are automatically skipped. Thus, it is possible to effectively tune up/down only the not-scrambled channel which can be viewed.

Furthermore, when the channel is directly tuned by the input unit 6 and whether the channel which is directly tuned by the input unit 6 is scrambled or not is judged based on the scrambling information stored in the channel map data 9a. When the channel which is directly tuned by the input unit 6 is judged as scrambled according to the execution of the channel judgment program 9l by the CPU 7, the not-scrambled sub channel in the same physical channel as this channel is searched and the channel is switched to the not-scrambled sub channel which is detected according to the execution of the switching program 9n by the CPU 7. The not-scrambled sub channel in the same physical channel is automatically tuned even when the scrambled sub channel which cannot be viewed is directly tuned. Thus, tuning to the scrambled sub channel which cannot be viewed can be prevented and only the not-scrambled channel which can be viewed can be directly tuned more effectively.

Second Embodiment

Regarding the digital broadcast receiving apparatus 400 according to the second embodiment of the present invention, for example, only the configuration of the memory unit 90 differs from the first embodiment of the digital broadcast receiving apparatus 100 according to the first embodiment. Thus, the same reference numerals are assigned to the same configuration and the descriptions thereof are omitted.

Figure 11:
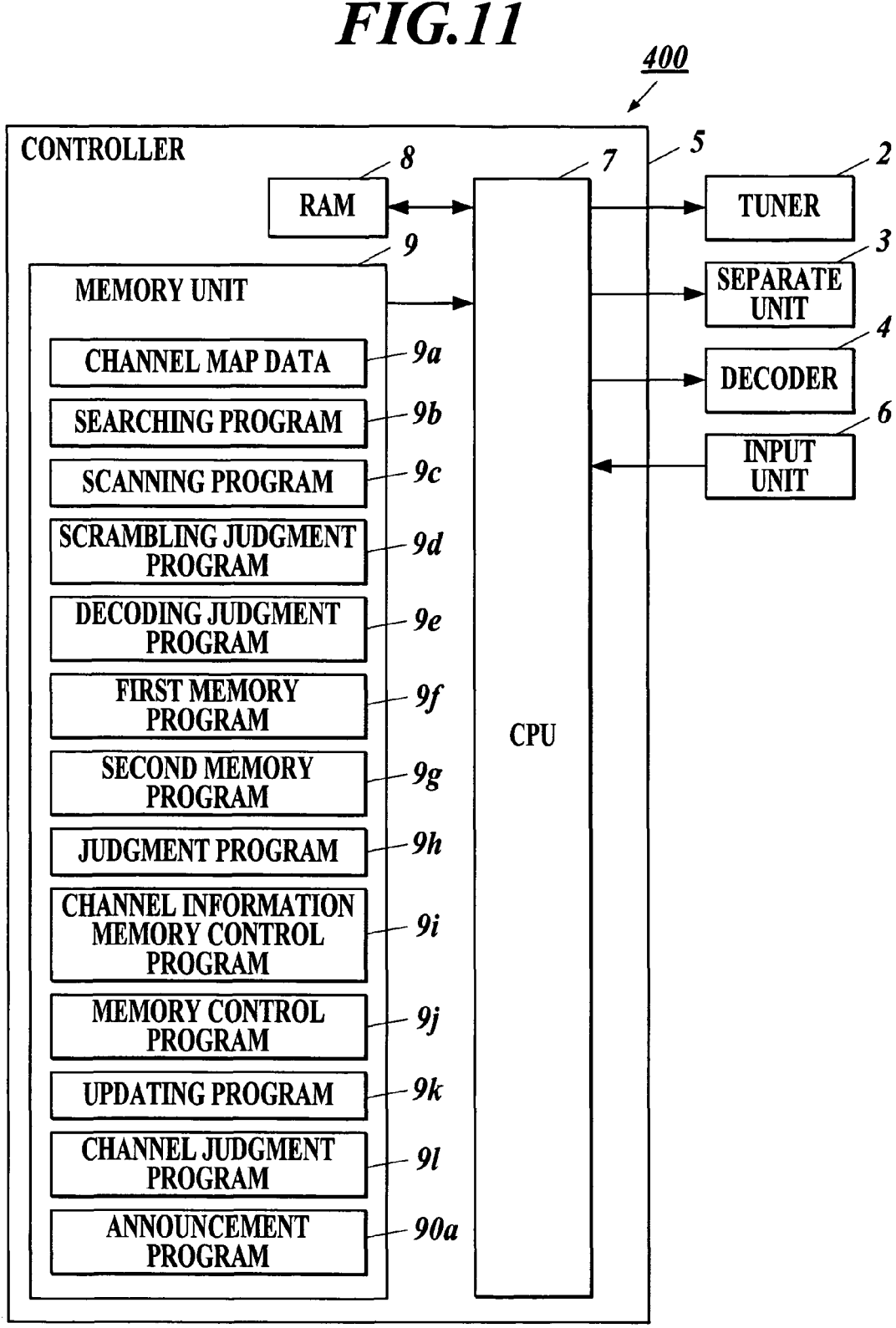
FIG. 11 is a block diagram describing relations between a control unit and each section according to the second embodiment of the present invention.

The memory unit 90, for example, has a recording medium in which program and data and the like are stored beforehand (omitted from the drawings). This recording medium, for example, comprises the semiconductor memory and the like. Further, the memory unit 90 stores various types of data in order to make the CPU 7 have the function to control the entire digital broadcast receiving apparatus 400, various types of processing programs, and data which are processed by the execution of these programs. More specifically, the memory unit 90, for example, stores the channel map data 9a, the searching program 9b, the scanning program 9c, the scrambling judgment program 9d, the decoding judgment program 9e, the first memory program 9f, the second memory program 9g, the judgment program 9h, the channel information memory control program 9i, the memory control program 9j, the updating program 9k, the channel judgment program 9l, the announcement program 90a and the like as shown in FIG. 11.

The announcement program 90a, for example, is a program which makes the CPU 7 have a function to make a predetermined announcement when the channel tuned up/down or the channel tuned directly by the input unit 6 is judged as scrambled according to the execution of the channel judgment program 9l. Here, the predetermined announcement, for example, is a message such as "This channel is scrambled" shown on the display device 200 or a message such as "This channel is scrambled" vocalized by the audio output device 300 or the like. The CPU 7 functions as the announcement unit by executing the above described announcement program 90a.

Figure 12:
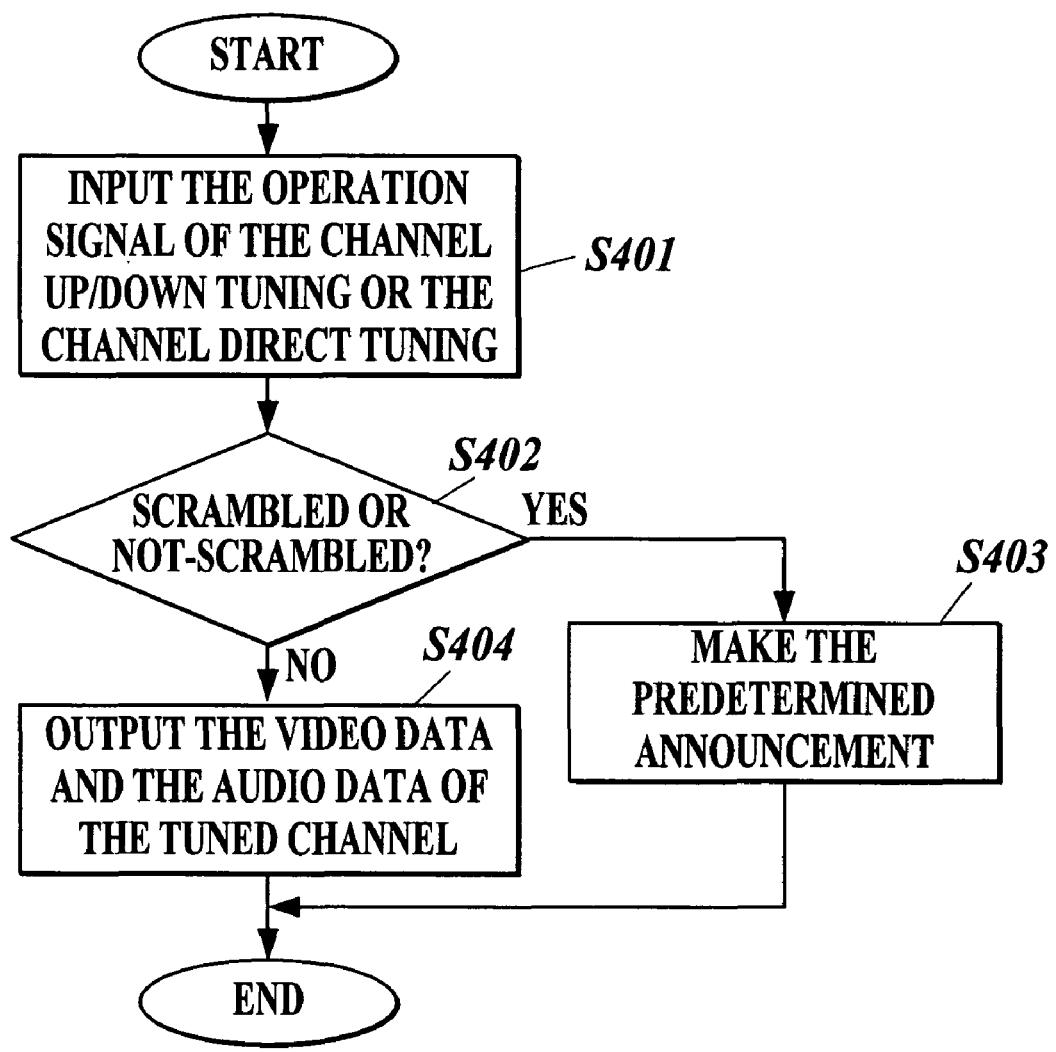
FIG. 12 is a flowchart describing announcement operation of a digital broadcast receiving apparatus according to the third embodiment of the present invention.

Next, the announcement operation of the digital broadcast receiving apparatus 400 according to the second embodiment which has a composition as described above will be explained referring to the flowchart shown in FIG. 12.

First, when the operation signal of the channel up/down tuning or the direct tuning is input due to the operation of the input unit 6 by a user (step S401), the CPU 7 judges whether the tuned channel is scrambled or not based on the scrambling information stored in the channel map data 9a by executing the channel judgment program 9l (step S402).

In step S402, when the CPU 7 judges that the tuned channel is scrambled (step S402; Yes), the CPU 7 makes the predetermined announcement by executing the announcement program 90a (step S403).

In step S402, when the CPU 7 judges that the tuned channel is not scrambled (step S402; No), the CPU 7 outputs the video data and the audio data of the tuned channel to the display device 200 and the audio output device 300 (step S404).

According to the digital broadcast receiving apparatus 400 according to the second embodiment of the present invention described above, the channel is tuned up/down by the input unit 6 and whether the channel tuned up/down by the input unit 6 is scrambled or not is judged based on the scrambling information stored in the channel map data 9a according to the execution of the channel judgment program 9l by the CPU 7. When the channel tuned up/down by the input unit 6 is judged as scrambled according to the execution of the channel judgment program 9l by the CPU 7, the predetermined announcement is made according to the execution of the announcement program 90a by the CPU 7. Therefore, a user can be prevented from mistaking the tuning of the channel for breakdown even when the scrambled channel is tuned by up/down tuning.

Further, when the channel is directly tuned by the input unit 6 and whether the channel directly tuned by the input unit 6 is scrambled or not is judged based on the scrambling information stored in the channel map data 9a according to the execution of the channel judgment program 9l by the CPU 7. When the channel directly tuned by the input unit 6 is judged as scrambled according to the execution of the channel judgment program 9l by the CPU 7, the predetermined announcement is made according to the execution of the announcement program 90a by the CPU 7. Therefore, a user can be prevented from mistaking the tuning of the channel for breakdown even when the scrambled channel is directly tuned.

Third Embodiment

Regarding the digital broadcast receiving apparatus 500 according to the third embodiment of the present invention, for example, only the composition of the memory unit 91 differs from the digital broadcast receiving apparatus 100 according to the first embodiment. Thus, the same reference numerals are assigned to the same composition and the descriptions thereof are omitted.

Figure 13:
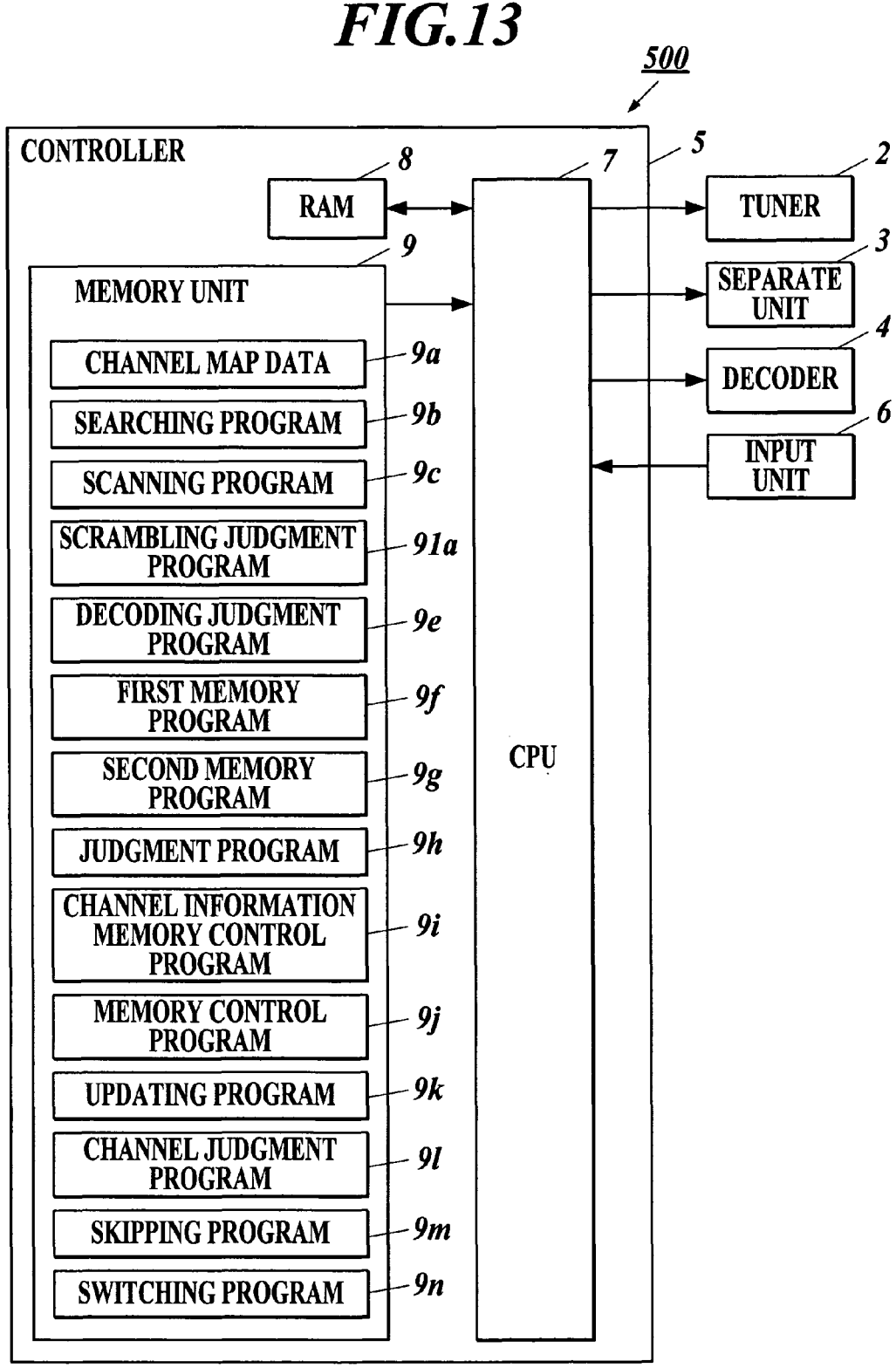
FIG. 13 is a block diagram describing relations between a control unit and each section according to the third embodiment of the present invention.

The memory unit 91, for example, has a memory medium in which program and data and the like are stored beforehand (omitted from the drawings). This memory medium, for example, comprises the semiconductor memory and the like. The memory unit 91 stores the data and various types of processing programs which make the CPU 7 have a function to control the entire digital broadcast receiving apparatus 500, and the data which are processed by the execution of these programs. More specifically, the memory unit 91, for example, stores the channel map data 9a, the searching program 9b, the scanning program 9c, the scrambling judgment program 91a, the decoding judgment program 9e, the first memory program 9f, the second memory program 9g, the judgment program 9h, the channel information memory control program 9i, the memory control program 9j, the updating program 9k, the channel judgment program 9l, the skipping program 9m, the switching program 9n and the like as shown in FIG. 13.

The scrambling judgment program 91a, for example, is a program which makes the CPU 7 have a function to judge whether the broadcast data of the physical channel is scrambled or not according to whether the PAT (Program Association Table) data which is included in the broadcast data of the same physical channel that is scanned by executing the scanning program 9c is scrambled or not.

More specifically, the scrambling judgment program 91a, for example, is a program which makes the CPU 7 have a function to judge that the broadcast data of the physical channel is scrambled when the PAT data included in the broadcast data of the same physical channel is scrambled, and to judge whether the broadcast data is scrambled or not by referring to each of the scrambling determination data of the sub channel included in the physical channel when the PAT data included in the broadcast data of this physical channel is not scrambled.

The CPU 7 functions as the scrambling judgment unit by executing the above-mentioned scrambling judgment program 91a.

Figure 14:
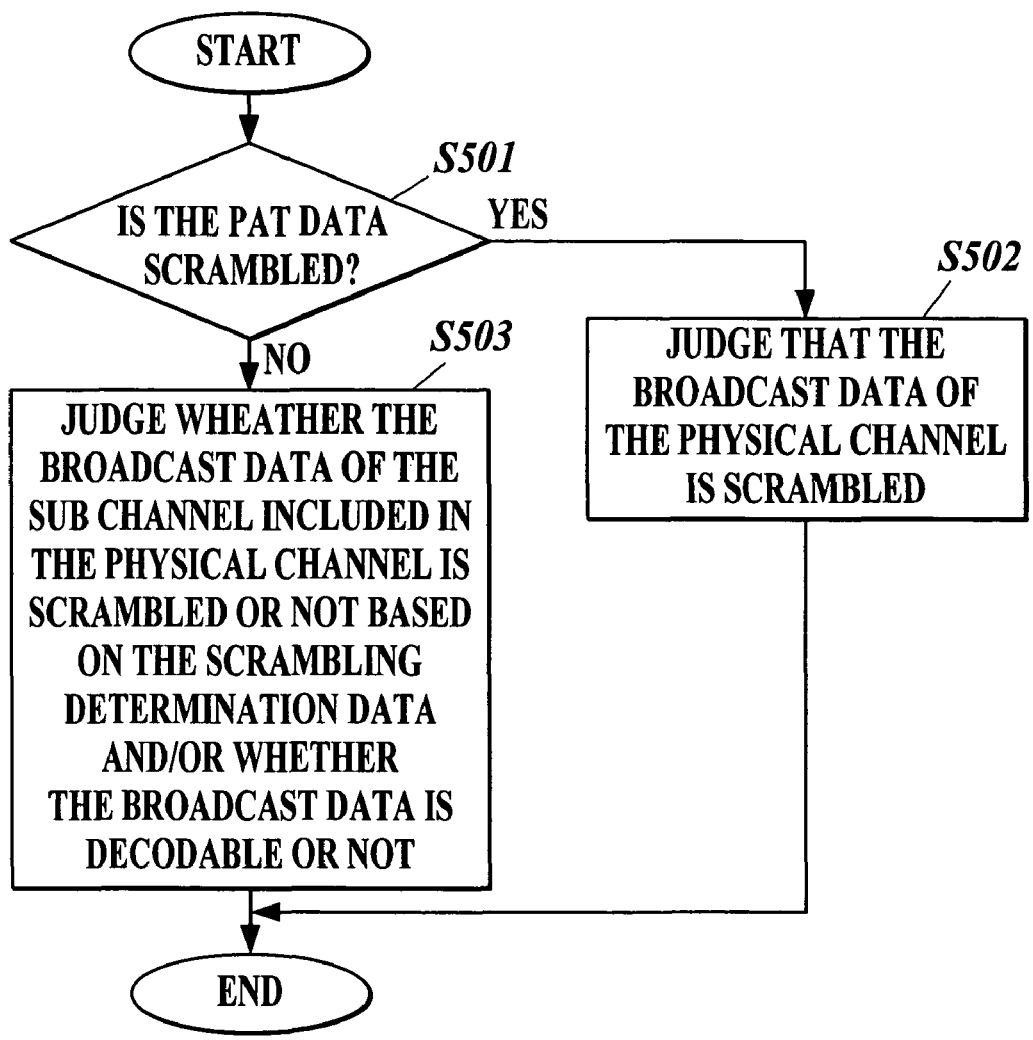
FIG. 14 is a flowchart describing judging operation for judging wherein data is scrambled or not-scrambled in a digital broadcast receiving apparatus according to the third embodiment of the present invention.

Next, the judgment operation for scrambled or not-scrambled of the digital broadcast receiving apparatus 500 according to the third embodiment of the present invention which has a construction as descried above will be explained referring to the flowchart shown in FIG. 14.

First, the CPU 7 judges whether the PAT data included in the broadcast data of the physical channel, which is scanned by executing the scanning program 9c, is scrambled or not according to the execution of the scrambling judgment program 91a (step S501).

In step S501, when the CPU 7 judges that the PAT data is scrambled (step S501; Yes), all of the broadcast data of the physical channel are judged as scrambled (step S502).

In step S501, when the CPU 7 judges that the PAT data is not scrambled (step S501; No), the CPU 7 judges whether the broadcast data of the sub channel included in the physical channel is scrambled or not by executing the same process as the step S7 through step S31 of the flowchart shown in FIGS. 4 to 7 (step S503).

According to the digital broadcast receiving apparatus 500 according to the third embodiment of the present invention described above, whether the broadcast data of the physical channel is scrambled or not is judged according to whether the PAT data included in the broadcast data of this same physical channel is scrambled or not according to the execution of the scrambling judgment program 91a by the CPU 7. Therefore, whether all of the broadcast data of the physical channel are scrambled or not can be judged by only referring to the PAT data. Thus, the judgment of scrambled or not-scrambled can be made more efficiently.

The order of the scrambling determination data to be referred to at the time of the execution of the scrambling judgment program 9d by the CPU 7 is not limited to the order described in the embodiment and can be in any order. Further, the order can be set by a user beforehand or can be set in the digital broadcast receiving apparatus 100 beforehand.

The predetermined data which is referred to according to the execution of the scrambling judgment program 9d by the CPU 7 is not limited to the data described in the embodiment. Any data which can discriminate whether the broadcast data is scrambled or not-scrambled can be used.

The multiplexing of the broadcast data of the physical channel can be done by a system other than the MPEG2-TS system. When the multiplexing is done by a system other than the MPEG2-TS system, the predetermined data which are referred to according to the execution of the scrambling judgment program 9*d* by the CPU 7 can be any data that is capable of deciding whether the broadcast data is scrambled or not-scrambled.

It is stated that the sub channel of the same physical channel as the directly tuned channel is searched according to the execution of the switching program 9*n* by the CPU 7, however, it is not limited to this. For example, when the not-scrambled sub channel is searched and detected within the same virtual channel as the directly tuned channel, the channel can be switched to this sub channel.

The entire disclosure of Japanese Patent Application No. Tokugan 2005-378323 which was filed on Dec. 28, 2005 including specification, claims, drawings and summary are incorporated herein by reference in its entirety.

What is claimed is:

1. A digital broadcast receiving apparatus, comprising:
    a scanning unit which scans a broadcast data of one or more sub channels included in a broadcast data of a physical channel in a digital broadcast wave;
    a channel information memory unit which stores the physical channel, a virtual channel, the sub channels, and scrambling information which indicates whether the sub channels are scrambled or not so as to refer the scrambling information to the sub channels;
    a scrambling judgment unit which judges whether the broadcast data of the sub channels, which is scanned by the scanning unit is scrambled or not;
    a memory control unit which stores a judgment result obtained by the scrambling judgment unit in the channel information memory unit as the scrambling information; and
    an updating unit which updates the scrambling information in the channel information memory unit by executing the scanning unit, the scrambling judgment unit, and the memory control unit at a predetermined timing; wherein:
    when the judgment result obtained by the scrambling judgment unit indicates that all of the sub channels in the physical channel are scrambled, the memory control unit stores information that the physical channel is a channel which needs to be scanned when the scrambling information is updated by the updating unit;
    the updating unit makes the scanning unit scan only the physical channel which has a not-scrambled sub channel stored in the channel information memory unit at the predetermined timing; and
    when the judgment result obtained by the scrambling judgment unit indicates that all of the sub channels in the physical channel are scrambled, the memory control unit stores information that the sub channels are not scrambled as the scrambling information of a predetermined sub channel of the physical channel.

2. The digital broadcast receiving apparatus as claimed in claim 1, comprising:
    a channel tuning unit which tunes a channel up/down;
    a channel judgment unit which judges whether the channel tuned up/down by the channel tuning unit is scrambled or not based on the scrambling information stored in the channel information memory unit; and
    a skipping unit which skips the channel tuned up/down by the channel tuning unit when the channel judgment unit judges that the channel is scrambled.

3. The digital broadcast receiving apparatus as claimed in claim 1, comprising:
    a channel tuning unit which tunes a channel up/down;
    a channel judgment unit which judges whether the channel tuned up/down by the channel tuning unit is scrambled or not based on the scrambling information stored in the channel information memory unit; and
    an announcement unit which makes a predetermined announcement when the channel judgment unit judges that the channel tuned up/down is scrambled.

4. The digital broadcast receiving apparatus as claimed in claim 1, comprising:
    a channel tuning unit which directly tunes a channel;
    a channel judgment unit which judges whether the channel which is directly tuned by the channel tuning unit is scrambled or not based on the scrambling information stored in the channel information memory unit;
    a switching unit which switches to a not-scrambled sub channel when the not-scrambled sub channel is searched and detected within the same physical channel as the tuned channel in case that the channel judgment unit judges that the channel which is directly tuned by the channel tuning unit is scrambled.

5. The digital broadcast receiving apparatus as claimed in claim 1, comprising:
    a channel tuning unit which directly tunes a channel;
    a channel judgment unit which judges whether the channel which is directly tuned by the channel tuning unit is scrambled or not based on the scrambling information stored in the channel information memory unit; and
    an announcement unit which makes a predetermined announcement when the channel judgment unit judges that the channel which is directly tuned by the channel tuning unit is scrambled.

6. The digital broadcast receiving apparatus as claimed in claim 1, wherein:
    the scrambling judgment unit judges whether the broadcast data of the sub channels, which is scanned by the scanning unit is scrambled or not by referring to each of a plurality of types of scrambling determination data used for judging whether the broadcast data is scrambled or not-scrambled, the scrambling determination data being included in the broadcast data of the sub channel.

7. The digital broadcast receiving apparatus as claimed in claim 1, wherein:
    the scrambling judgment unit judges whether the broadcast data of the physical channel is scrambled or not according to whether a program association table data included in the broadcast data of the physical channel is scrambled or not.

8. A digital broadcast receiving apparatus, comprising:
    a scanning unit which scans a broadcast data of one or more sub channels included in a broadcast data of a physical channel in a digital broadcast wave;
    a channel information memory unit which stores the physical channel, a virtual channel, the sub channels, and scrambling information which indicates whether the sub channels are scrambled or not so as to refer the scrambling information to the sub channels;
    a scrambling judgment unit which judges whether the broadcast data of the sub channels, which is scanned by the scanning unit is scrambled or not;
    a memory control unit which stores a judgment result obtained by the scrambling judgment unit in the channel information memory unit as the scrambling information; and
    an updating unit which updates the scrambling information in the channel information memory unit by having the scanning unit scan only the physical channel that has a not-scrambled sub channel which is stored in the channel information memory unit and by executing the scrambling judgment unit and the memory control unit at a predetermined timing; wherein:

when the judgment result obtained by the scrambling judgment unit indicates that all of the sub channels in the physical channel are scrambled, the memory control unit stores information that the sub channels are not scrambled as the scrambling information of a predetermined sub channel of the physical channel;

and wherein the scrambling judgment unit comprises:

a first judgment unit which judges whether the broadcast data of the sub channel, which is scanned by the scanning unit is scrambled or not by referring to each of a plurality of types of scrambling determination data used for judging whether the broadcast data is scrambled or not-scrambled, the scrambling information data being included in the broadcast data of the sub channel;

a second judgment unit which judges whether the broadcast data is scrambled or not according to whether the broadcast data is decodable or not;

and wherein the memory control unit comprises:

a first memory control unit which stores information that the sub channel is not scrambled in the channel information memory unit when the first judgment unit judges that the broadcast data is not scrambled;

a second memory control unit which stores information that the sub channel is not scrambled in the channel information memory unit when the second judgment unit judges that the broadcast data is decodable;

a judgment unit which judges whether a judgment result obtained according to the first judgment unit by referring to one of the plurality of types of the scrambling determination data coincides with a judgment result obtained according to the second judgment unit or not; and a channel information memory control unit which makes the second memory control unit store the information in the channel information memory unit when the judgment unit judges that the judgment result obtained according to the first judgment unit does not coincide with the judgment result obtained according to the second judgment unit by referring to all of the types of the scrambling determination data, and makes the first memory control unit store the information in the channel information memory unit by referring to the one of the plurality of types of the scrambling determination data when the judgment unit judges that the judgment result obtained according to the first judgment unit by referring to the one of the plurality of types of scrambling determination data coincides with the judgment result obtained according to the second judgment unit.

* * * * *